(12) United States Patent
Arai et al.

(10) Patent No.: US 6,421,515 B1
(45) Date of Patent: Jul. 16, 2002

(54) READER CONTROLLER CONNECTED TO A PRINTER CONTROLLER

(75) Inventors: Koji Arai, Ohmiya; Masanori Sakai, Yokohama; Yasuhiro Kozuka, Inagi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,082

(22) Filed: Sep. 28, 1999

(30) Foreign Application Priority Data

Sep. 29, 1998 (JP) .......................................... 10-275931

(51) Int. Cl.⁷ .............................................. G03G 15/00
(52) U.S. Cl. ........................ 399/175; 399/81; 358/296
(58) Field of Search ................................ 358/296, 300, 358/448, 450; 395/112, 113, 114; 399/1, 2, 38, 75, 81, 82, 83, 85, 87, 130

(56) References Cited

U.S. PATENT DOCUMENTS

| | | | | |
|---|---|---|---|---|
| 5,299,296 A | * | 3/1994 | Padalino et al. ............ 395/112 |
| 5,396,345 A | * | 3/1995 | Motoyama ................... 358/448 |
| 5,669,040 A | * | 9/1997 | Hisatake ....................... 399/83 |
| 5,815,280 A | * | 9/1998 | Ohmura et al. ............. 358/256 |
| 5,907,410 A | * | 5/1999 | Ohtake ........................ 358/468 |

\* cited by examiner

Primary Examiner—Arthur T. Grimley
Assistant Examiner—Hoang Ngo
(74) Attorney, Agent, or Firm—Fitzpatrick, Cella, Harper & Scinto

(57) ABSTRACT

A reader controller is connected to a printer controller which controls a engine controller provided in a printer. The printer includes a controlling unit for controlling a document reader which reads documents, a receiving unit for receiving a command for the engine controller from the printer controller, and a counting unit for counting a number of documents processed by the reader controller in accordance with a control of the controlling unit, and counting a number of sheets processed by the printer controller in accordance with the command received by the receiving unit. The printer further includes a causing unit for causing a display of the reader to display the number counted by the counting unit.

26 Claims, 34 Drawing Sheets

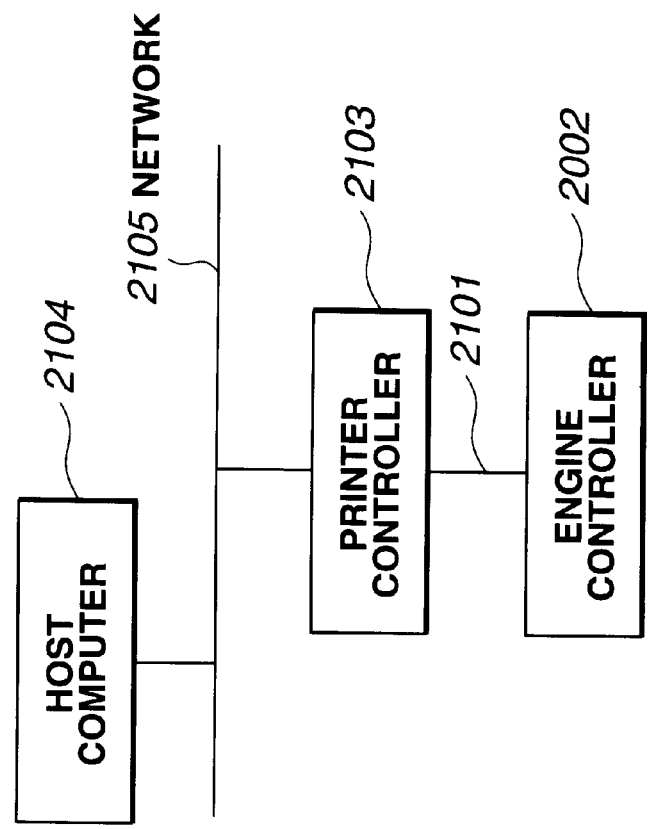
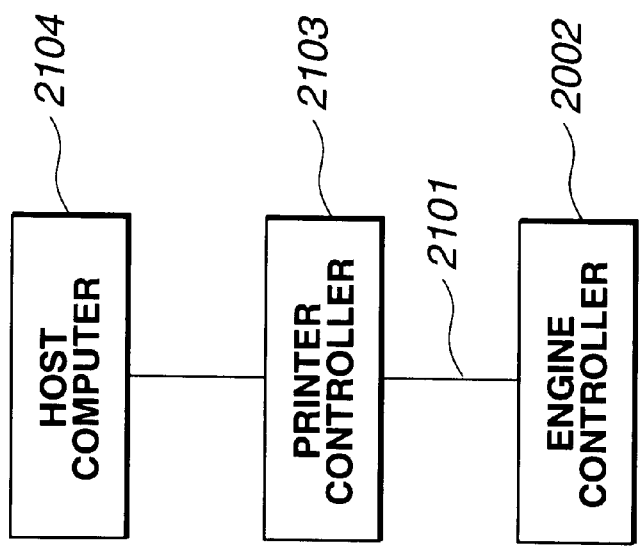

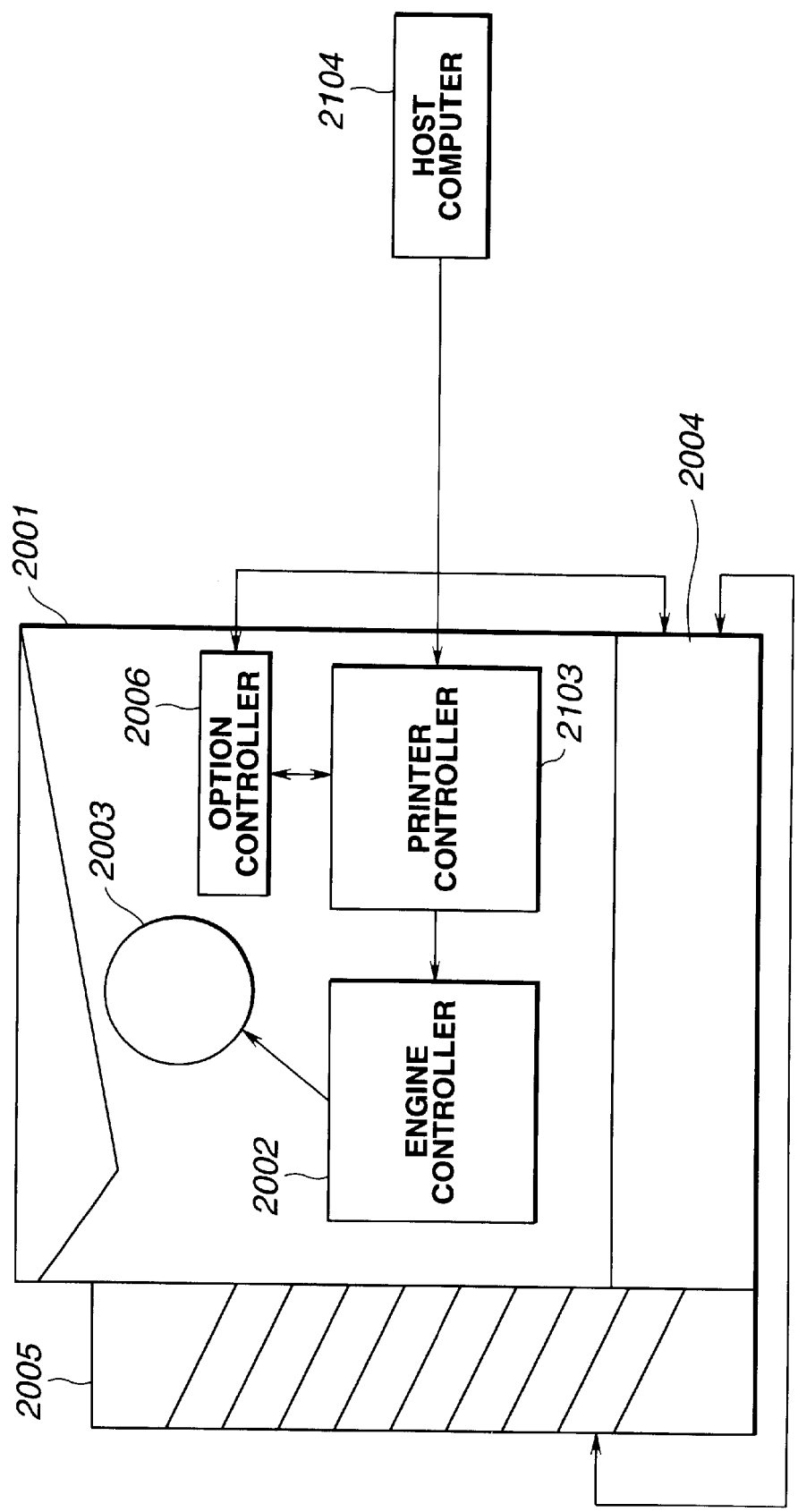

FIG.4

| SIGNAL NAME | ABBREVIATION | DIRECTION |
|---|---|---|
| PRINTER POWER READY | /PPRDY | PRINTER CONTROLLER ← ENGINE CONTROLLER |
| CONTROLLER POWER READY | /CPRDY | ENGINE CONTROLLER ← PRINTER CONTROLLER |
| READY | /RDY | PRINTER CONTROLLER ← ENGINE CONTROLLER |
| PRINT | /PRNT | ENGINE CONTROLLER ← PRINTER CONTROLLER |
| TOP OF PAGE | /TOP | PRINTER CONTROLLER ← ENGINE CONTROLLER |
| LINE SYNCHRONIZATION | /LSYNC | PRINTER CONTROLLER ← ENGINE CONTROLLER |
| VIDEO CLOCK | /VCLK | ENGINE CONTROLLER ← PRINTER CONTROLLER |
| VIDEO ENABLE | /VDOEN | ENGINE CONTROLLER ← PRINTER CONTROLLER |
| VIDEO | /VDO | ENGINE CONTROLLER ← PRINTER CONTROLLER |
| CONTROLLER CLOCK | /CCLK | ENGINE CONTROLLER ← PRINTER CONTROLLER |
| COMMAND BUSY | /CBSY | ENGINE CONTROLLER ← PRINTER CONTROLLER |
| COMMAND | /CMD | ENGINE CONTROLLER ← PRINTER CONTROLLER |
| STATUS BUSY | /SBSY | PRINTER CONTROLLER ← ENGINE CONTROLLER |
| STATUS | /STS | PRINTER CONTROLLER ← ENGINE CONTROLLER |
| PAPER FEED | /PFED | ENGINE CONTROLLER ← PRINTER CONTROLLER |
| SPEED CHANGE | /SPCHG | ENGINE CONTROLLER ← PRINTER CONTROLLER |
| PAPER DELIVERY | /PDLV | ENGINE CONTROLLER ← PRINTER CONTROLLER |
| TOP OF PAPER | /TOPR | PRINTER CONTROLLER ← ENGINE CONTROLLER |
| CHANGING OF CURRENT STATUS | /CCRT | PRINTER CONTROLLER ← ENGINE CONTROLLER |

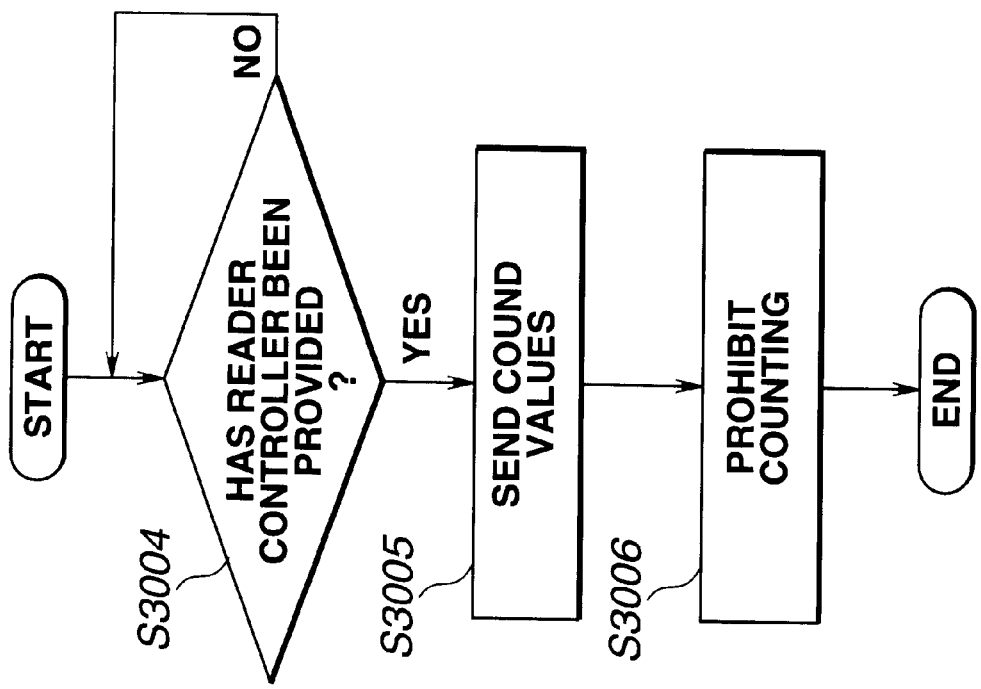
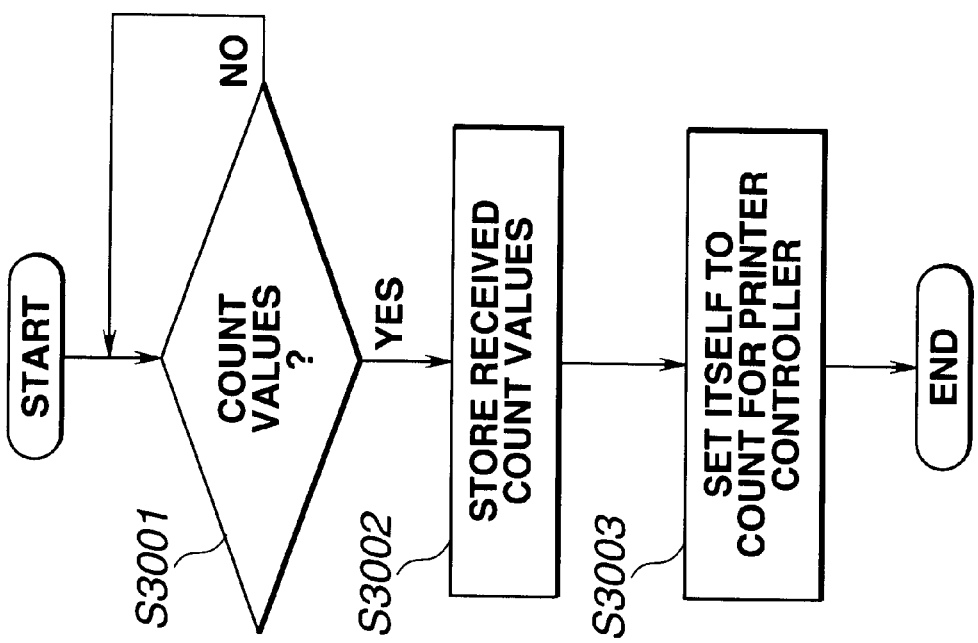

FIG.33

PRINTER COUNT

| PROCESS 1 | 1 TO 1 | | | | 2 IN 1 | | | |
|---|---|---|---|---|---|---|---|---|
| PROCESS 2 | SIMPLEX PRINT | | DUPLEX PRINT | | SIMPLEX PRINT | | DUPLEX PRINT | |
| SIZE | A3 | A4 | A3 | A4 | A3 | A4 | A3 | A4 |
| GENERAL SHEET | 105 | 365 | 73 | 527 | 54 | 176 | 38 | 264 |
| SPECIAL SHEET | 23 | 35 | 14 | 48 | 17 | 19 | 7 | 24 |

FIG.34

READER COUNT

| PROCESS | DIRECT | | MAGNIFY | |
|---|---|---|---|---|
| SIZE | A3 | A4 | A3 | A4 |
| BLACK AND WHITE | 536 | 752 | 167 | 246 |
| SPECIAL SHEET | 53 | 84 | 23 | 42 |

FIG.35

DOCUMENT FEEDER COUNT

| PROCESS | 1 SIDE | 2 SIDE |
|---|---|---|
| A3 | 536 | 289 |
| A4 | 891 | 433 |

FIG.36

SHEET FEEDER COUNT

| MATERIAL | GENERAL SHEET | OHP |
|---|---|---|
| A3 | 685 | 233 |
| A4 | 998 | 466 |

FIG.37

SHEET SORTER COUNT

| PROCESS 1 | NON-STAPLE | | STAPLE | |
|---|---|---|---|---|
| PROCESS 2 | NON-SORT | SORT | NON-SORT | SORT |
| A3 | 105 | 72 | 83 | 55 |
| A4 | 632 | 253 | 494 | 199 |

READER CONTROLLER CONNECTED TO A PRINTER CONTROLLER

BACKGROUND OF THE INVENTION

1. Field of the Invention

The present invention relates to a reader controller which counts the number of sheets processed by a printer controller.

2. Description of the Related Art

Certain users use both a copy machine and a printer, whereas others use only a printer. A user who already has a printer may need a copy machine later. In order to meet the situation, it is proposed that a document reader and a printer are connected and used as a copy machine. That is, the document reader and the printer are treated as modules, and each is combined with one or more modules if necessary. The document reader is placed above the printer using a rack so that the document reader and the printer are combined as a copy machine.

On the other hand, the document reader has a counter for counting the number of documents processed by the document reader and a display for displaying the number. The printer has a counter for counting a number of sheets processed by the printer and a display for displaying the counted number as well. However, when the document reader is placed above the printer, the display of the printer is hidden by the document reader. Thus there is a problem that it is hard to see the counted number displayed on the display of the printer. Although it is desired to solve the problem, it is not desired to extensively change the circuit of the printer and the scanner.

SUMMARY OF THE INVENTION

An object of the invention is that the number of sheets processed in the printer mode can be displayed on the display of the reader without extensively changing the circuit of the printer. In order to achieve this and other objects of the invention, the present invention provides a reader controller connected to a printer controller which controls a engine controller provided in a printer, comprising: controlling means for controlling a document reader which reads documents; receiving means for receiving a command for said engine controller from said printer controller; counting means for counting a number of documents processed by said reader controller in accordance with a control of said controlling means, and counting a number of sheets processed by said printer controller in accordance with the command received by said receiving means; and causing means for causing a display of said reader to display the number counted by said counting number.

Other objects and features of the invention will be apparent from the following description and the drawings.

BRIEF DESCRIPTION OF THE DRAWINGS

FIG. 1 shows the basic constitution of the printer.

FIG. 2 shows the system comprising the printer, the sheet feeder, and the sheet sorter.

FIG. 4 shows a table of video interface signals.

FIG. 32 shows a flowchart when the printer controller transfers a count value to the reader controller.

FIG. 33 shows an example of the count values related with printer controller.

FIG. 34 shows an example of the count values related with reader controller.

FIG. 35 shows an example of the count values related with document feeder controller.

FIG. 36 shows examples of the count values related with option controller.

FIG. 37 shows examples of the count values related with option controller.

DESCRIPTION OF THE PREFERRED EMBODIMENT

FIG. 1 shows a relationship between a host computer, a printer controller, and an engine controller in a printer. Video interface 2102 is for communicating between engine controller 2002 and printer controller 2103. The signals of video interface 2102 will be described later. Engine controller 2002 controls the printer's mechanism for forming a visible image in accordance with a electrical image signal received through video interface 2102 and transforming the image onto a sheet and fixing the image on the sheet. Engine controller 2002 also detects the status of the printer and reports the status to printer controller 2103. FIG. 1(A) shows a printer connected directly to host computer 2104. Printer controller 2103 in FIG. 1(A) receives data from host computer 2104 directly. FIG. 1(B) shows the printer connected to host computer 2104 through a network 2105. Printer controller 2103 in FIG. 1(B) receives data from host computer 2104 through network 2105. Printer controller 2103 receives code data written in PDL (Page Description Language) representing an image. Printer controller 2103 also receives data written in various forms other than PDL. Printer controller 2103 converts PDL data into raster type data and commands, and sends the raster data and commands to engine controller 2002. The raster type data is also called bit map data. In this manner, image data created in host computer 2104 can be printed. Printer controller 2103 should be provided in the printer.

FIG. 2 shows a system comprising printer 2001, sheet feeder 2004, and sheet sorter 2005. Printer 2001 is the basis of the system. Engine controller 2002 controls a sheet transportation and an image forming operation in printer 2001. Engine controller 2002 controls image forming unit 2003. Printer controller 2103 is provided in printer 2001. Host computer 2104 is connected to printer controller 2103 directly or through network 2105. Sheet feeder 2004 and sheet sorter 2005 are options of the system. Sheet feeder 2004 feeds sheets to printer 2001. Sheet sorter 2005 sorts sheets discharged from printer 2001. Printer controller 2103 sends commands to option controller 2006 in accordance with commands received from host computer 2104. Printer controller 2103 counts the number of sheets processed by engine controller 2002 based on the commands which printer controller 2103 sends. Option controller 2006 controls sheet feeder 2004 in accordance with the commands. Option controller also controls sheet sorter 2005 through sheet feeder 2004 in accordance with the commands.

Figure 3:
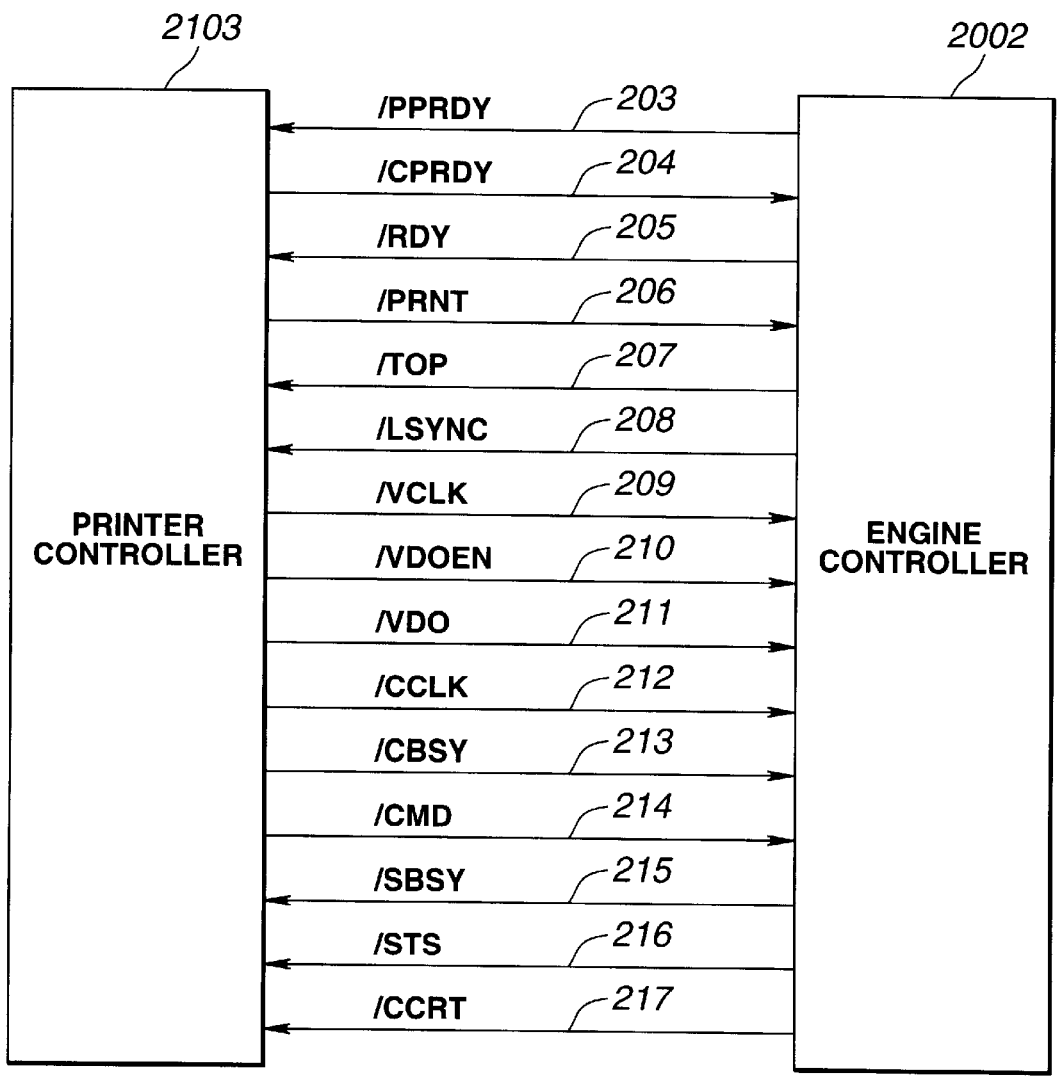
FIG. 3 shows representative signals between the printer controller and the engine controller.

FIG. 3 shows representative signals in video interface 2101. FIG. 4 shows a table of video interface signals. Representative signals will be described here after. /PPRDY 203 indicates that engine controller 2002 is enabled to communicate with printer controller 2103. /CPRDY 204 indicates that printer controller 2103 is enabled to communicate with engine controller 2002. /RDY 205 indicates that the condition of printer 2001 is ready for printing. /PRNT 206 indicates that the printing process of engine controller 2002 should start or continue. /TOP 207 is a vertical sync signal of printing. /LSYNC 208 is a horizontal sync signal of printing. /VCLK 209 is a sync clock for /VDOEN 210 and /VDO 211. /VDOEN 210 controls taking image data from printer controller 2103 into engine controller 2002. /VDO 211 is image data. /CCLK 212 is a sync clock which is used when a serial command is sent to engine controller 2002 and a serial status is sent to printer controller 2103. /CBSY 213 indicates that printer controller 2103 sends /CMD 214. /CMD 214 is a command from printer controller 2103. /SBSY 215 indicates that engine controller 2002 sends /STS 216. /STS 216 is a status from engine controller 2103. /CCRT 217 indicates that the status of printer 2001 has changed.

Figure 5:
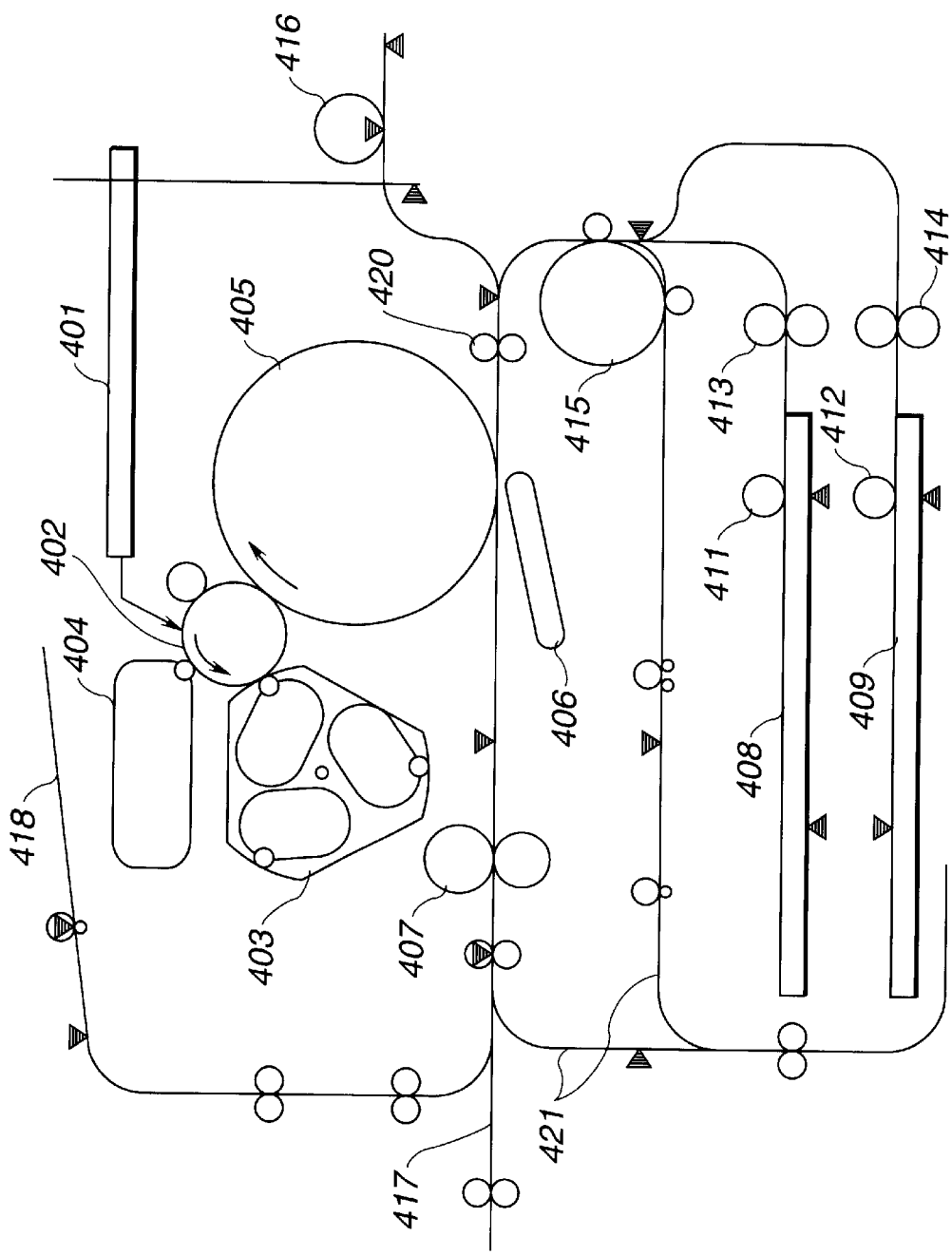
FIG. 5 shows the electrophotographic printer mechanism.

FIG. 5 shows an electrophotographic printer mechanism, which is controlled by engine controller 2002, and sheet delivery paths. Scanner 401 scans a laser beam over a photosensitive medium 402 in accordance with image signals (/VDO) received from printer controller 2103. Then, an electrostatic image is formed on photosensitive medium 402. Photosensitive medium 402 rotates counterclockwise. Then, the electrostatic image gets through black developing unit 404 and color developing unit 403. Black developing unit 404 and color developing unit 403 accrete toner on photosensitive medium 402 in accordance with the electrostatic image on photosensitive medium 402. Only black developing unit 404 is used when a black image is to be printed. Black developing unit 404 and color developing unit 403 are used sequentially when a color image is to be printed. The toner image formed on photosensitive medium 402 is transferred to intermediate transferring medium 405. Intermediate transferring medium 405 is contacted with photosensitive medium 402 and rotates clockwise. One revolution of intermediate transferring medium 405 is needed to form a black image on intermediate transferring medium 405. Four revolutions of transferring medium 405 is needed to form a color image on intermediate transferring medium 405. Meanwhile, a sheet is picked up by pick-up roller 411 or 412 from upper cassette 408 or lower cassette 409. The sheet is fed by feed roller 413 or 414 and fed up to feed roller 420 by resist roller 415. A sheet is fed up to resist roller 420 by feed roller 416 when a manual feed is performed.

Resist roller 420 starts to feed the sheet so as to reach the sheet to the contact point between intermediate transferring medium 405 and transferring belt 406 when the toner image generation on intermediate transferring medium 405 is finished. Then, toner image is transferred from intermediate transferring medium 405 to the sheet at the contact point between intermediate transferring medium 405 and transferring belt 406. The image transferred onto the sheet is fixed by heat and pressure at fixing roller 407.

Figure 6:
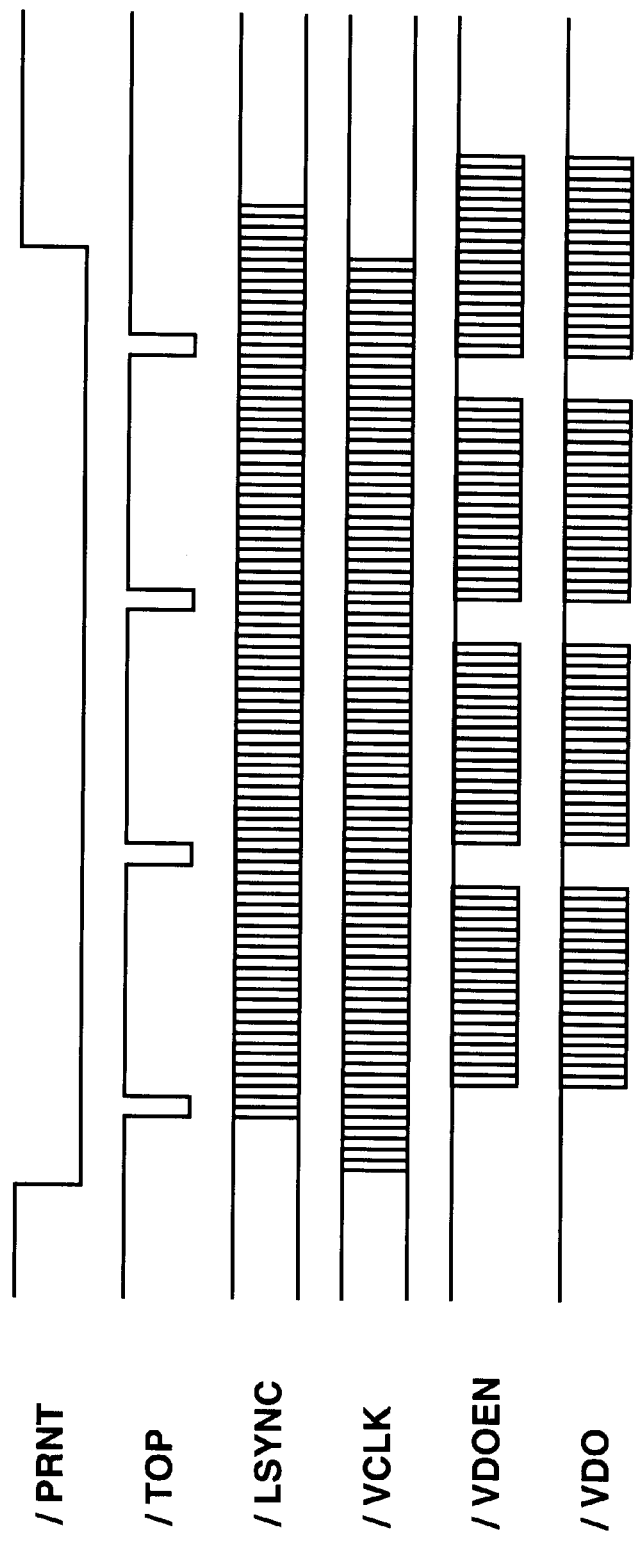
FIG. 6 shows a timing chart of signals on a video interface.

Then, the sheet is discharged from face-up discharge path 417 or face-down discharge path 418 in accordance with a designation of printer controller 2103. When a two sided print is carried out, the sheet is re-fed through path 421. FIG. 6 shows a timing chart of signals on video interface 2101. Printer controller 2103 makes /PRNT a low level in order to inform engine controller 2002 that preparation of image information is finished. Printer controller 2103 generates image sync signal /VCLK which is used for sending a image signal at the same time with making /PRNT a low level.

Engine controller 2002 performs settings of printer 2001 in accordance with /PRNT. Engine controller 2002 outputs vertical sync signal /TOP and horizontal sync signal /LSYNC to printer controller 2103 when it becomes possible to receive an image signal. Then, printer controller 2103 transmits image signal /VDO and image enabling signal /VDOEN to engine controller 2002 in sync with /TOP signal and /LSYNC signal.

Figure 7:
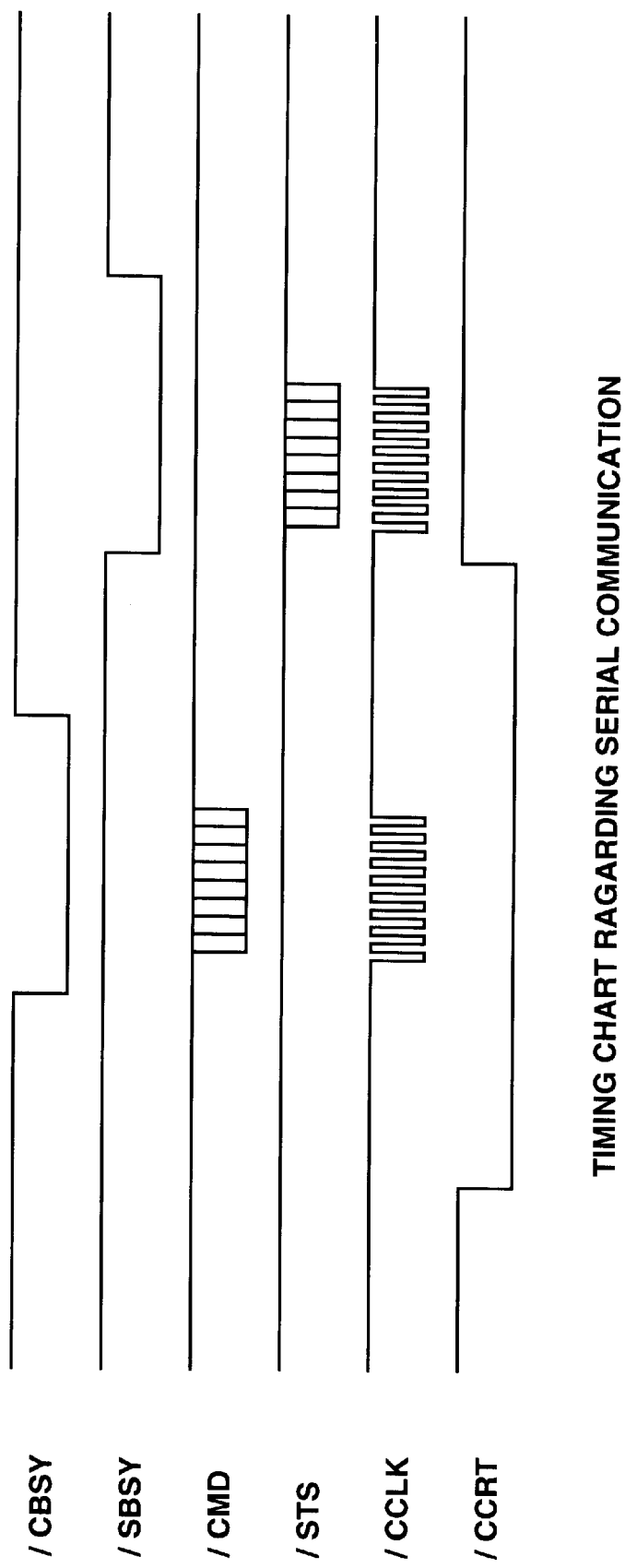
FIG. 7 shows a timing chart of a serial communication.

FIG. 7 shows a timing chart of a serial communication between printer controller 2103 and engine controller 2002. A communication without using /CCRT signal will be described hereinafter. When printer controller 2103 send commands to engine controller 2002, printer controller 2103 makes /CBSY signal a low level (TRUE), then sends command data /CMD in sync with clock signal /CCLK. When engine controller 2002, which has received /CMD, checks that /CBSY is a high level (FALSE), engine controller 2002 makes /SBSY a low level (TRUE). Then, engine controller 2002 sends status data ISTS in sync with /CCLK signal.

A communication using /CCRT signal will be described hereinafter. /CCRT is made a low level (TRUE) when a predetermined engine status is designated by printer controller 2103. For example, it is designated by /CMD to enable /CCRT signal when the paper runs out. Then, printer controller 2103 requests a print for two pages when printer 2001 has only one sheet. The first page is processed in accordance with the request. Since there is no second sheet, engine controller 2002 detects no paper when print processing of the second page begins. Engine controller 2002 changes /CCRT signal from a high level to a low level in accordance with detecting no paper. Printer controller 2103 sends a command requesting a paper presence status to engine controller 2002 in order to know which cassette does not have a paper. Engine controller 2002 returns a status indicating a cassette which does not have a paper. /CCRT is changed to a high level when /SBSY signal is changed to a low level.

Figure 8:
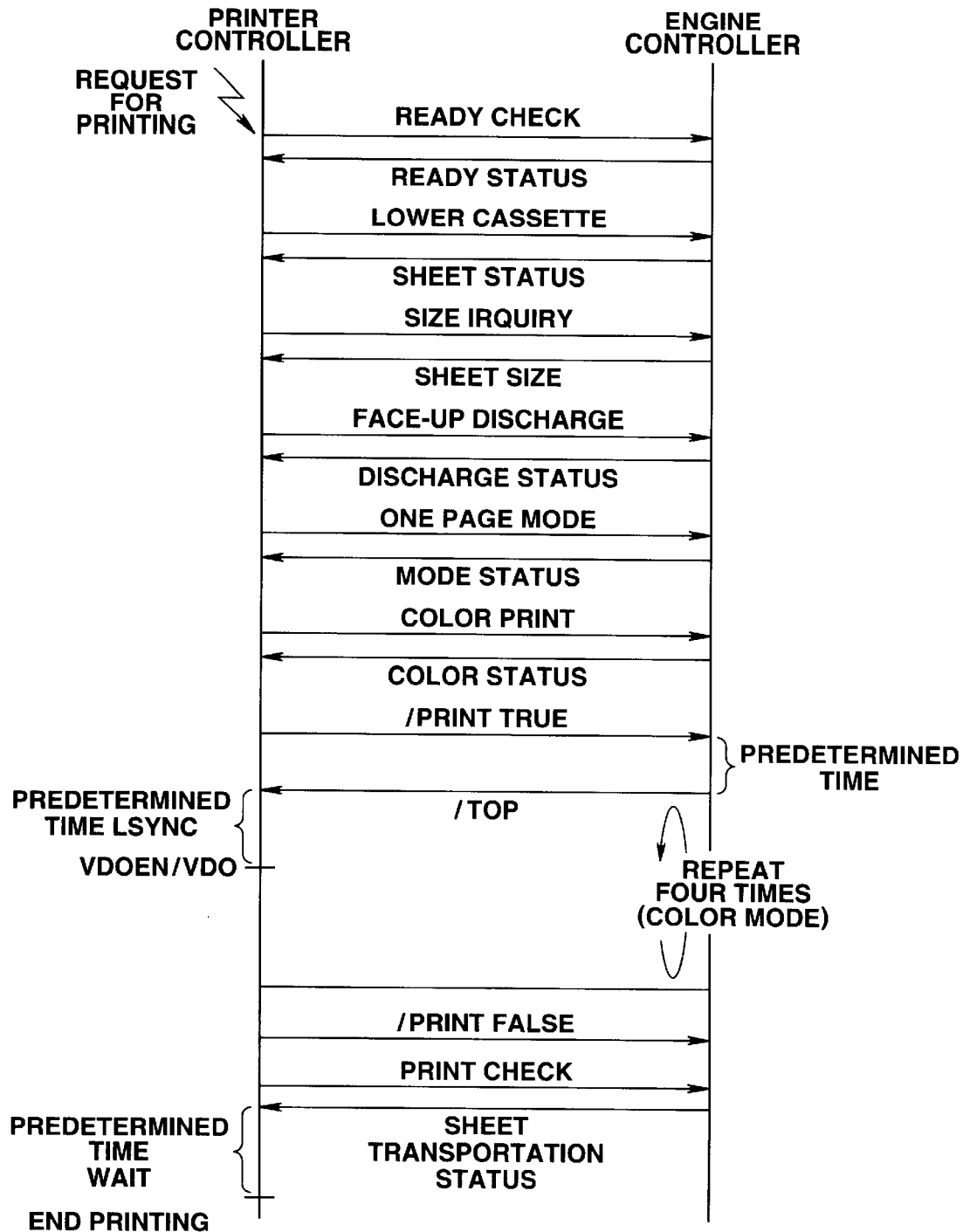
FIG. 8 shows an exchange of commands and statuses between the printer controller and the engine controller.

FIG. 8 shows an exchange of commands and statuses between printer controller 2103 and engine controller 2002 when a color print is performed. Printer controller 2103 sends a request of a ready check to engine controller 2002. Engine controller 2002 sends a ready status to printer controller 2103 in response to the request when receiving the ready status. Printer controller 2103 designates lower cassette 409 to engine controller 2002. Engine controller 2002 sends a sheet status of the lower cassette 409 to printer controller 2103. Printer controller 2103 sends a request of a sheet size of lower cassette 409 to engine controller 2002. Engine controller 2002 sends the sheet size of lower cassette 409 to printer controller 2103. Printer controller 2103 designates face-up discharge to engine controller 2002. Engine controller 2002 sends a designated discharge status to printer controller 2103. Printer controller 2103 designates one page mode to engine controller 2002. Engine controller 2002 sends a designated mode status to printer controller 2103. Printer controller 2103 designates a color print to engine controller 2002. Engine controller 2002 sends a designated color status to printer controller 2103. Then, printer controller 2103 sets /PRNT to be TRUE. Engine controller 2002 generates /TOP signal after a predetermined time has passed from when /PRNT was set to be TRUE. Printer controller 2103 sends image data /VDO to engine controller 2002 after a predetermined time has passed from when printer controller 2103 receives /TOP signal. The image data /VDO is sent four times because of the color mode. Then, printer controller 2103 sets /PRNT to be FALSE. Printer controller 2103 sends a request of a print status to engine controller 2002. Engine controller 2002 sends a sheet transportation status to printer controller 2103. Printer controller goes into a waiting state after a predetermined time has passed from checking the sheet transportation status.

Figure 9:
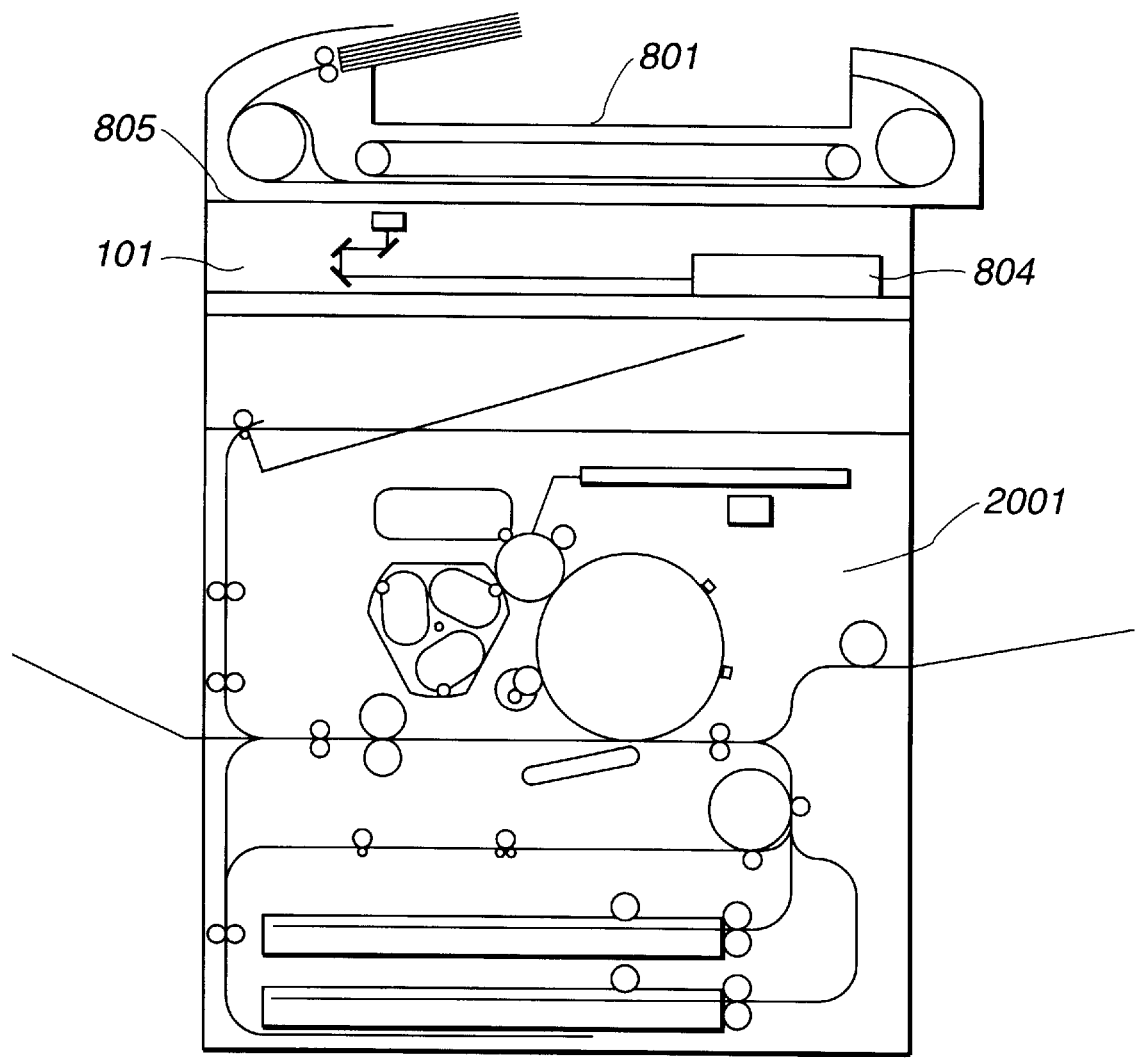
FIG. 9 shows the system comprising the document feeder, the reader, the printer.

FIG. 9 shows a system comprising document feeder 801, reader 101, printer 2001. Document feeder 801 transports documents to plate glass 805. Document feeder 801 works in sync with reader 101. An optical system provided in reader 101 scans a image of the document and leads the image to photoelectric conversion unit 804.

Figure 10:
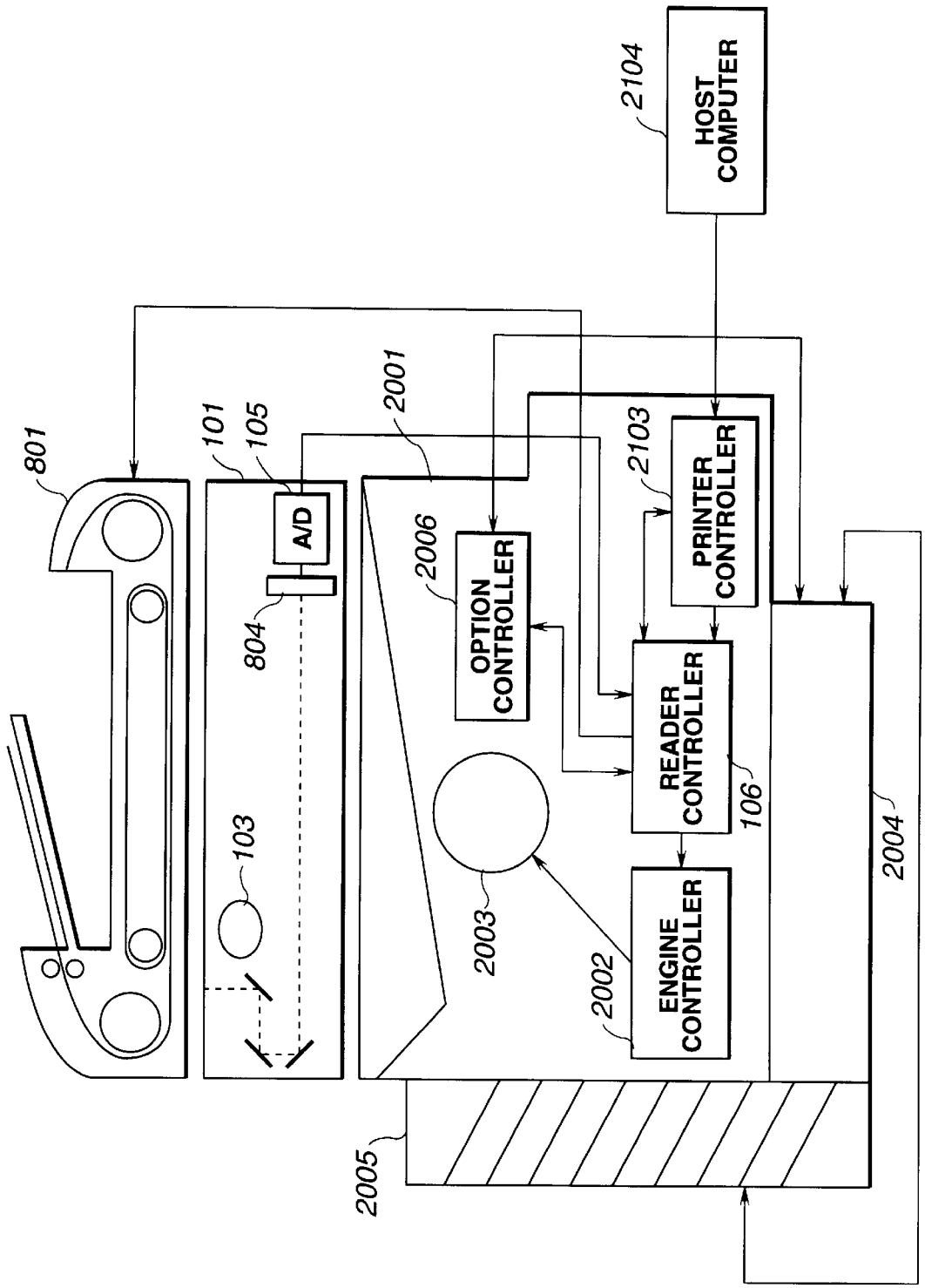
FIG. 10 shows the system comprising the document feeder, the reader, the printer, the sheet feeder, and the sheet sorter.

FIG. 10 shows a system comprising document feeder 801, reader 101, printer 2001, sheet feeder 2004, and sheet sorter 2005. Numeral 103 indicates a light. Numeral 105 indicates an A/D converter. Reader controller 106, which controls a reader 101 and document feeder 801, is provided between engine controller 2002 and printer controller 2103. Reader controller 106 can count the number of originals processed by reader controller 106. Reader controller 106 is provided in printer 2001. Reader controller 106 connects video interface 2101 of engine controller 2002 and video interface 2101 of printer controller 2103. Reader controller 106 relays image data and commands received from printer controller 2103 to engine controller 2002. Therefore reader controller 106 can count the number of sheets processed by engine controller 2002. Reader controller 106 causes reader 101 to read a document and generates a command for engine controller 2002. Reader controller 106 sends image data received from reader 101 and commands to engine controller 2002. Option controller 2006 is connected to reader controller 106. Reader controller 106 sends commands to engine controller 2002 and option controller 2006 in accordance with a setting of a operation panel of the reader 101. The commands for option controller 2006 are output from printer controller 2103 and relayed to option controller 2006 by reader controller 106. Therefore reader controller 106 can count the number of sheets processed by the options. Printer controller 2103 and engine controller 2002 are the same as described above. Although printer 2001 is used not only as a printer but also as a printer unit of a copier, printer controller 2103 and engine controller 2002 do not have to be changed extensively. Host computer 2104 is connected to printer 2001 directly or through network 2105. The system shown in FIG. 10 has a printer function and a copy function.

Figure 11:
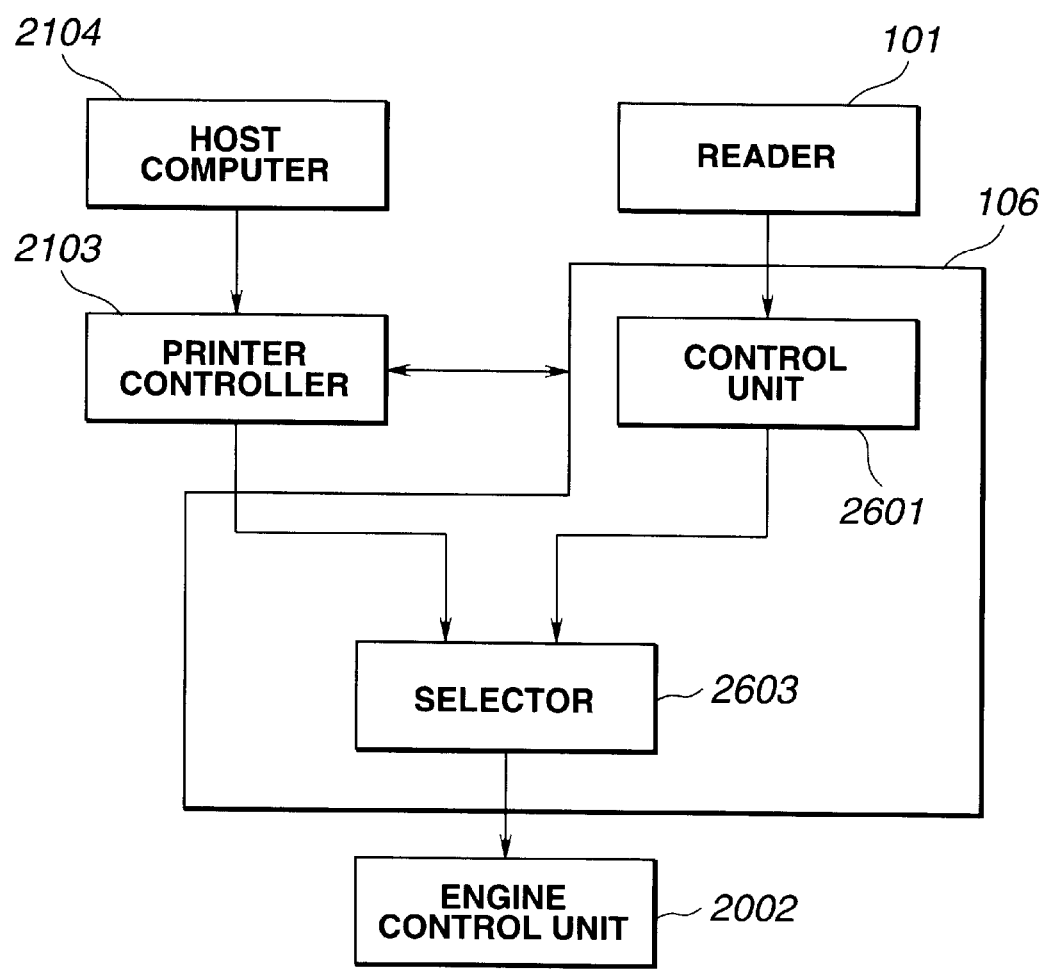
FIG. 11 shows a block diagram representing communication channel of signals in the system.
Figure 12:
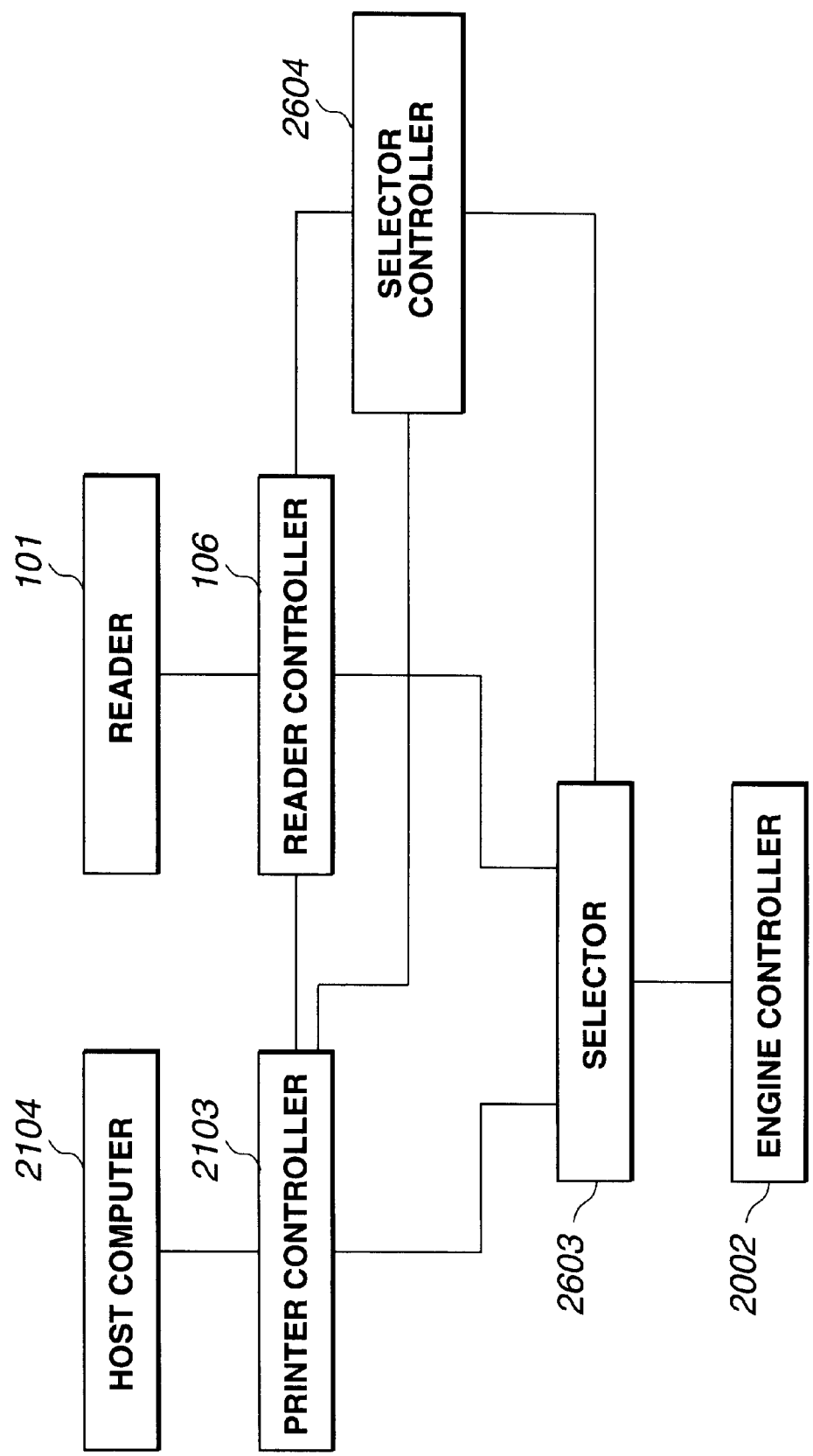
FIG. 12 shows a block diagram representing communication channel of signals in the system.

FIG. 11 shows a block diagram representing communication channel of signals in the system shown in FIG. 10. Signals between printer controller 2103 and engine controller 2002 and signals between reader controller 106 and engine controller 2002 go through selector 2603 in reader controller 106. Although selector 2603 in FIG. 11 is included in reader controller 106, reader controller 106 and printer controller 2103 could be repositioned, and selector 2603 could be included in printer controller 2103. Selector 2603 could be separated from reader controller 106 and printer controller 2103 as shown FIG. 12. In this case, selector controller 2604 is provided for controlling selector 2603.

Figure 13:
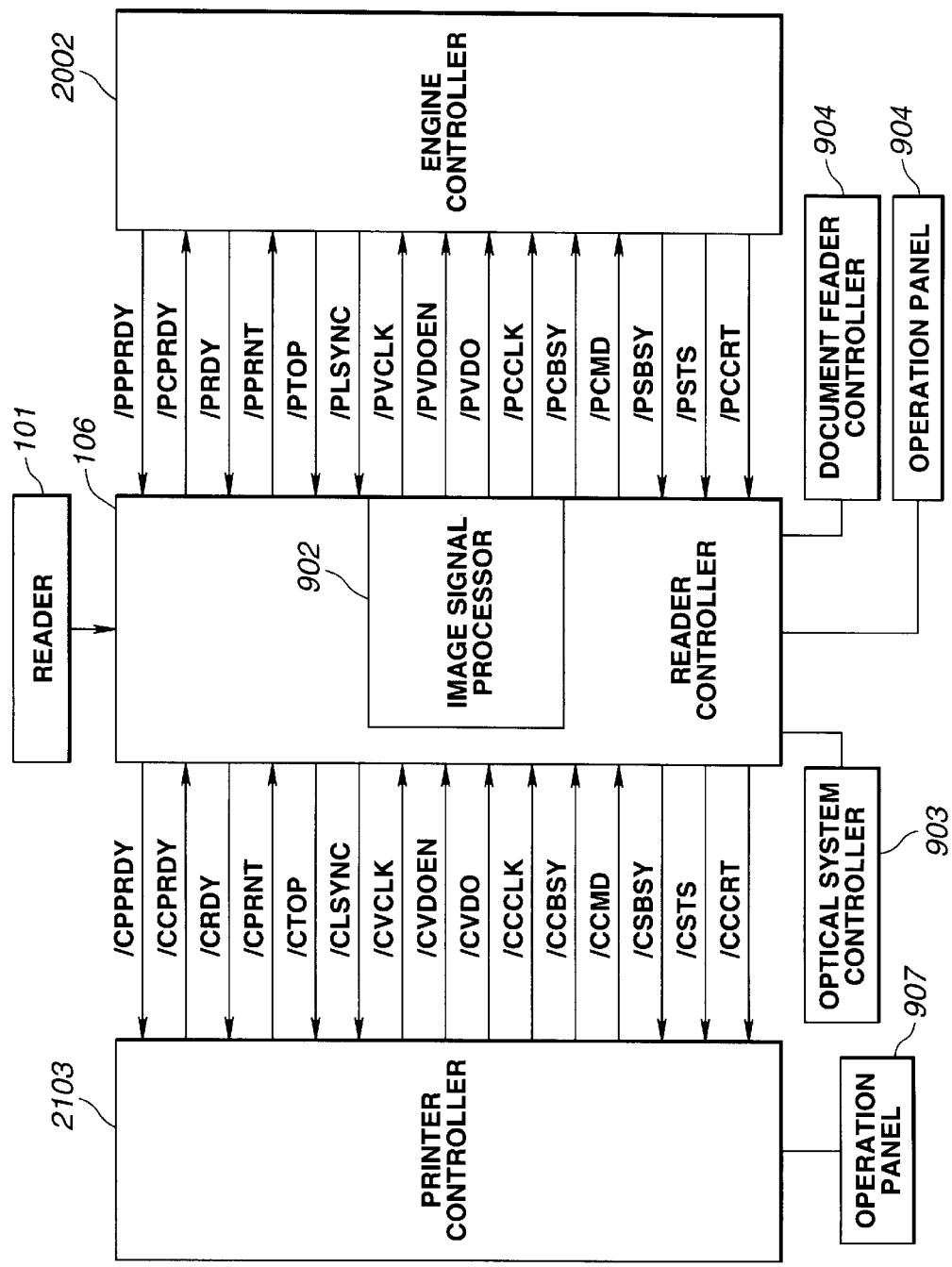
FIG. 13 shows communications between the printer controller, the engine controller, and the reader controller.

FIG. 13 shows a connection between printer controller 2103, engine controller 2002, and reader controller 106. Reader controller 106 is provided and connected between printer controller 2103 and engine controller 2002. Signals between printer controller 2103 and reader controller 106 and signals between engine controller 2002 and reader controller 106 have the same function as signals shown in FIG. 3. However, since signals between printer controller 2103 and reader controller 106 are physically different from signals between engine controller 2002 and reader controller 106, signals between printer controller 2103 and reader controller 106 have an added character 'C', whereas signals between reader controller 106 and engine controller 2002 have an added character 'P'. Signals without 'C' or 'P' mean both signals 'C' and 'P'.

Figure 14:
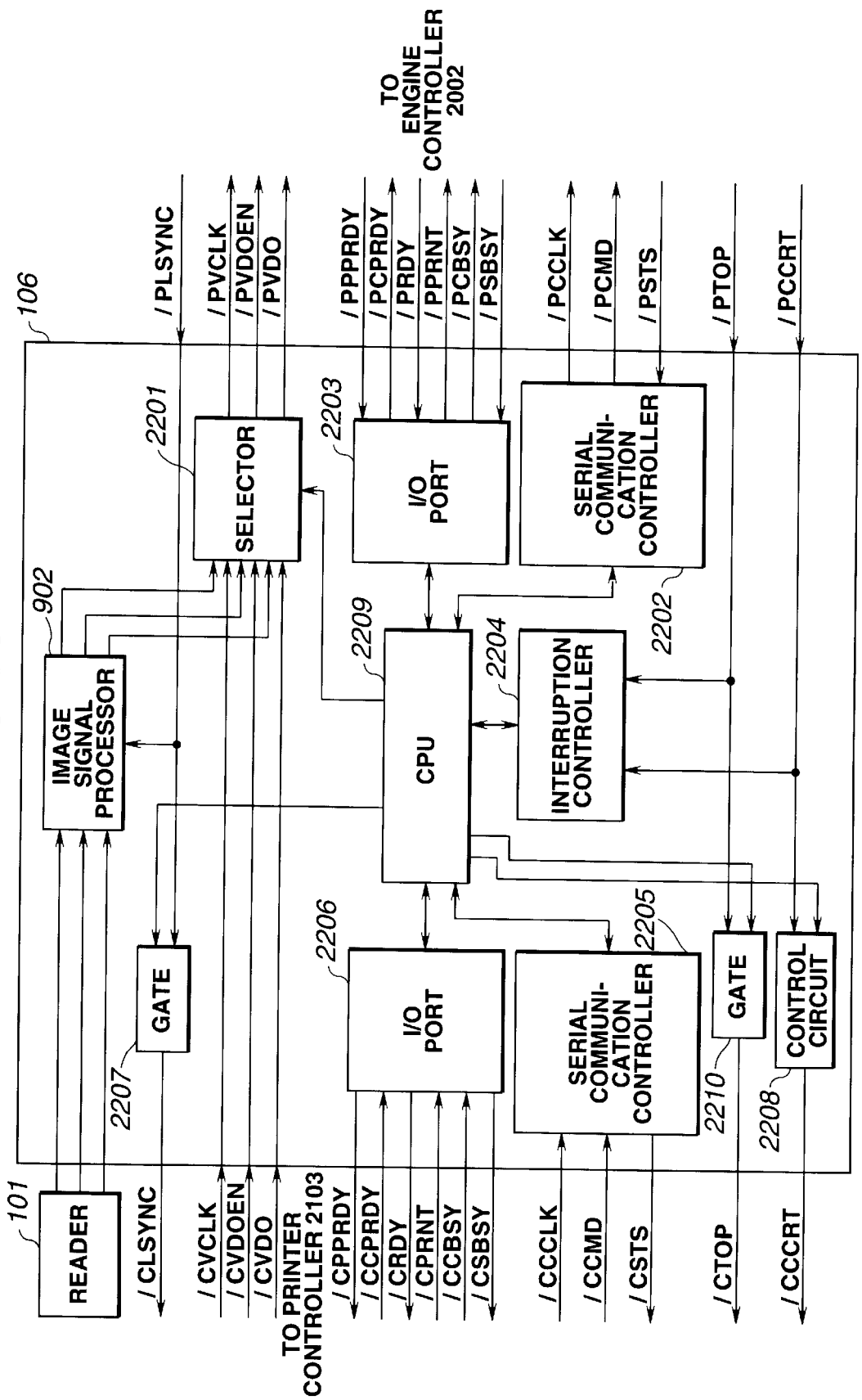
FIG. 14 shows a block diagram in the reader controller.

Numeral 902 indicates a image signal processing unit. Numeral 903 indicates an optical system controller which controls an optical system of reader 101. Numeral 904 indicates a document feeder controller which controls document feeder 801. Numeral 905 indicates an operational panel of reader 101. Image signals converted in photoelectric conversion unit 804 are input into reader controller 106 and sent to image signal processing unit 902. FIG. 14 shows a block diagram of reader controller 106, which pertains to printer controller 2103 and engine controller 2002. Selector 2201 selects one of a signal received from reader 101 and a signal received from printer controller 2103 and outputs it to engine controller 2002. Signals selected by selector 2201 are image clock /VCLK, image enable /VDON, and image data /VDO. Serial communication controller 2202 communicates with engine controller 2002. I/O port 2203 exchanges signals which supplement the communication of serial communication controller 2202. Numeral 2204 indicates an interruption controller. Image top request signal /PTOP and printer status change signal /PCCRT are input into interruption controller 2204. Serial communication controller 2205 communicates with printer controller 2103. I/O port 2206 exchanges signals which supplement the communication of serial communication controller 2205. Gates 2207 and 2210 control whether signals received from engine controller 2002 are sent to printer controller 2103. The signals controlled by gates 2207 and 2210 are image top request signal /TOP and line sync signal /LSYNC. Control circuit 2208 has a gate function and a flag set function, and controls printer status change signal /CCRT. Printer status change signal /PCCRT is relayed by opening the gate of control circuit 2208. Printer status signal change signal /CCCRT is generated by setting a flag in control circuit 2208.

Figure 15:
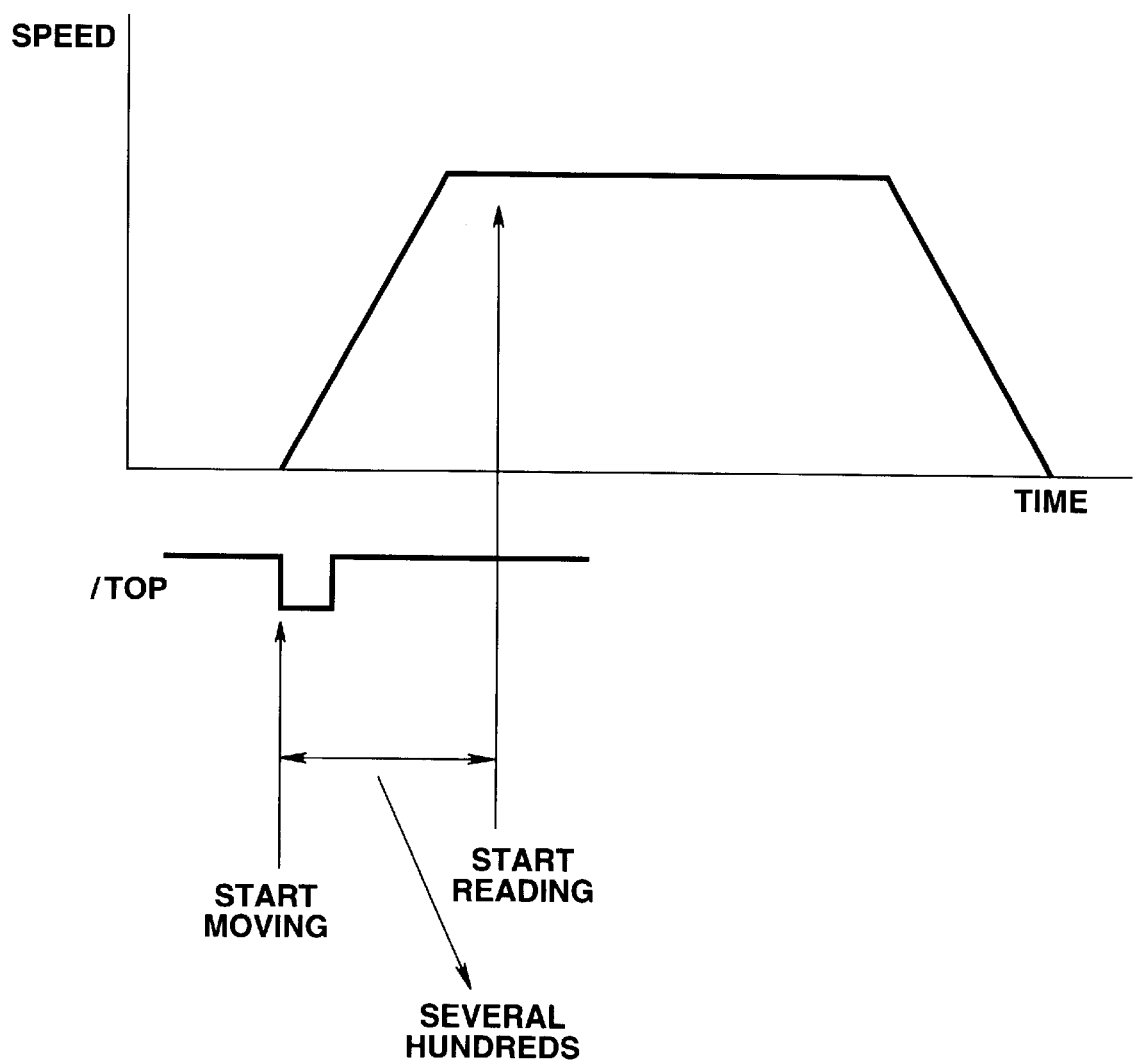
FIG. 15 shows a timing of reading a document by the reader.

The process of reading a full color original image and printing the image will be described with reference to FIGS. 9, 14, and 15 hereinafter. Reader controller 106 distinguishes a copy mode when a copy start key on operation panel 905 is pressed. Then, reader controller 106 closes gates 2207 and 2210 and control circuit 2208 and makes selector 2201 select the signal received from image signal processor 902.

Reader controller 106 checks ready state signal /PPPRDY using I/O port 2203 and sets various settings in engine controller 2002 using serial communication controller 2202 as described above. That is, sheet cassette designation command and sheet size request command are generated. Engine controller 2002 sends statuses in response to the commands.

Discharge path designation command and page mode designation command are generated. A command, which designates whether it is monochrome mode or color mode, is generated.

Reader controller 106 generates print request signal /PPRNT to engine controller 2002 after document feeder 801 feeds a document onto plate glass 805. Engine controller 2002 sends /PTOP signal in response to /PPRNT signal. Interruption controller 2204 receives /PTOP signal and interrupts CPU 2209. CPU 2209 controls optical system controller 903 so that reader 101 scans in sync with /PTOP signal. Signal input from photoelectric conversion unit 804 to image signal processor 902 is sent as /PVDO signal in sync with /PTOP, /PLSYNC, and /PVCLK. Since it is in color mode, reader 101 scans four times, and image formations for four colors C, M, Y, K are performed in response to four /PTOP signals.

Printer controller 2103 sets /PRNT signal to a high level (FALSE) in accordance with the reception of the final /TOP signal. Thereby engine controller 2002 detects that the print request is finished, and starts a cleaning of intermediate transferring medium 405 and so on. The sheet transferred toner is transported through fixing roller 407, and is discharged from the designated discharge path. Printer controller 2103 requests the print status from engine controller 2002 and confirms that engine controller 2002 is not in a sheet transport state, or that engine controller 2002 is in a discharge complete state. Printer controller 2103 distinguishes a print complete state after waiting for a predetermined time from the confirmation, and waits for a next print request in a ready state.

The process, with which an image received from printer controller 2103 is printed, will be described hereinafter. Reader controller 106 enters a ready state when the copying operation is finished. Reader controller 106 opens gates 2207 and 2210 and control circuit 2208 for a printing operation when reader controller 106 is in the ready state.

Reader controller 106 checks ready state signal /PRDY of printer 2001 by using I/O port 2203. Reader controller 106 sets ready state signal /CRDY of printer 2001 by using I/O port 2206 if the check result is OK.

Then, printer controller 2103 communicates with reader controller 106 in the same fashion as it communicates with engine controller 2002. Reader controller 106 communicates with printer controller 2103 by using serial communication controller 2205. CPU 2209 recognizes data received from printer controller 2103, performs various settings in accordance with contents of data. A communication between reader controller 106 and engine controller 2002 is performed by using serial communication controller 2202. Engine controller 2002 sends statuses, which correspond to commands received from reader controller 106, to reader controller 106. Reader controller 106 receives the statuses by using serial communication controller 2202. CPU 2209 recognizes the received contents, and sends them to printer controller 2103 by using serial communication controller 2205.

Then, printer controller generates print request /CPRNT to reader controller 106. Reader controller 106 generates print request /PPRNT to engine controller 2002 in response to /CPRNT. Engine controller sends /PTOP to reader controller 106 in response to /CPRNT. Since gate 2210 is opened, /PTOP signal is relayed to printer controller 2103 as /CTOP signal. Printer controller 2103 sends /CVDO signal to reader controller 106 in sync with /CTOP signal, /CLSYNC signal, and /CVCLK. Selector 2201 is designated to select signals received from printer controller 2103. Then, /CVCLK, /CVDOEN, and /CVDO signals are sent to engine controller 2002 as /PVCLK, /PVDOEN, and /PVDO respectively.

A difference between the operation in the print mode and the operation in the copy mode will be described in view of an output timing of the image hereinafter.

Printer controller 2103 has an image memory for storing image data to be printed before printing. Therefore there is no delay except an electrical delay when printer controller 2103 outputs print data /VDO in response to image top request signal /TOP received from engine controller 2002.

In contrast, reader 101 outputs image data by moving the optical system in reader 101. Reader 101 needs time for accelerating from a state, in which the optical system does not move, to a state, in which the speed of the optical system is sufficient to scan an original. For example, the acceleration time is several hundred milliseconds as shown in FIG. 15. Therefore, image data /VDO in the copy mode is delayed several hundred milliseconds in comparison with image data /VDO in the print mode. The following two manners resolve the delay in the copy mode.

1. Send /TOP in the copy mode at faster timing than the one in the print mode.
 2. Provide another signal (RSTART) for the copy mode.

Achieving manner 1 does not require changing the block diagram of reader controller 106 in FIG. 14. Reader controller 106 starts to move the optical system in response to /TOP signal. The output timing of /TOP signal is advanced for the delay.

Figure 16:
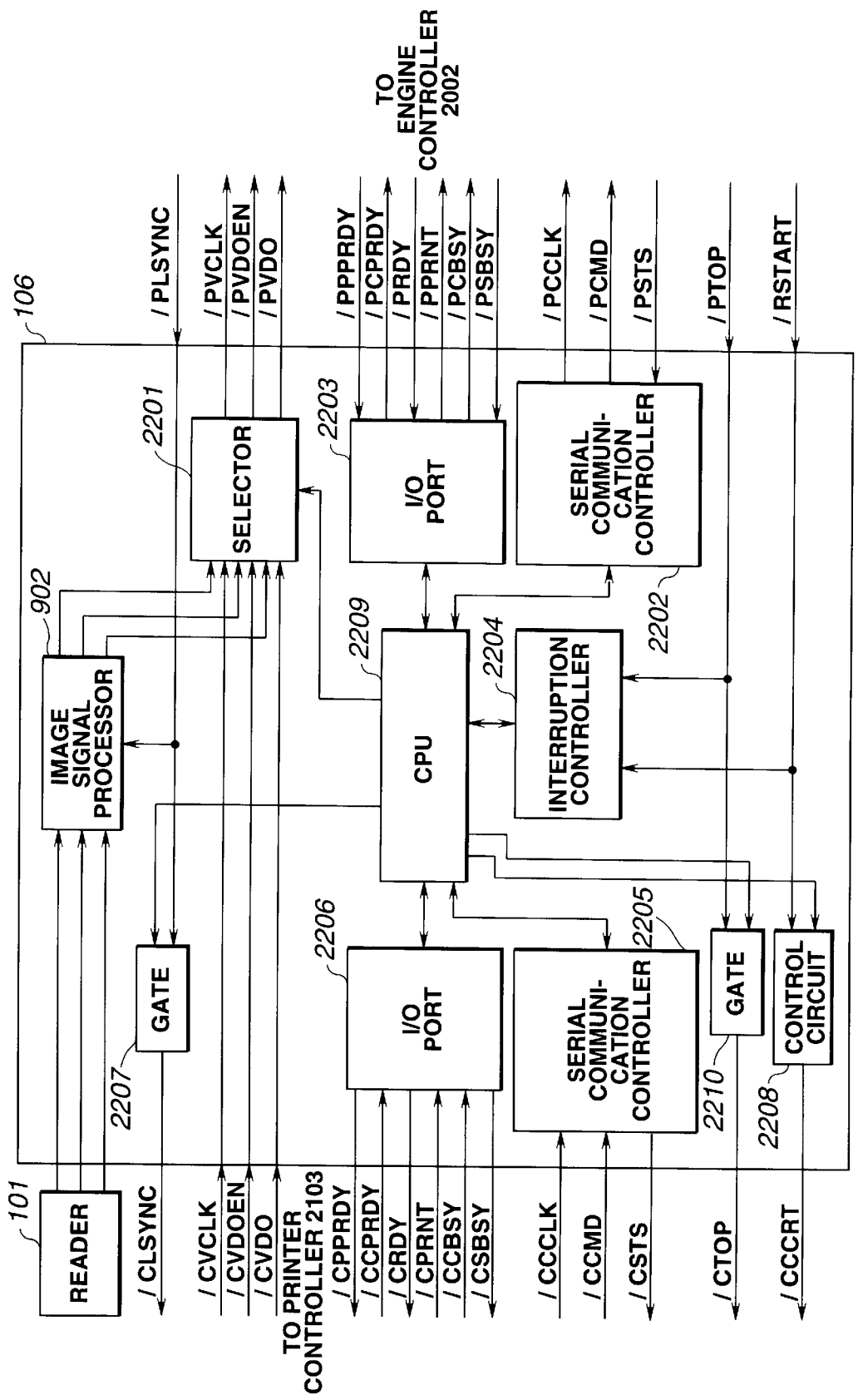
FIG. 16 shows another block diagram in the reader controller.

For achieving manner 2, the block diagram shown in FIG. 16 is used instead of the block diagram shown in FIG. 14. The difference between FIG. 16 and FIG. 14 is that reader start request signal /RSTART, which is generated by engine controller 2002, is input into interruption controller 2204 and /PTOP is not input into interruption controller 2204 in FIG. 16. Because image top request signal /PTOP is originally needed only when printer controller 2103 performs printing, and printer controller 2103 does not need reader start request signal /RSTART, engine controller 2002 outputs /RSTART signal at a timing taking into consideration the delay. Therefore, the delay between modes could be shortened.

As mentioned above, the communication between printer controller 2103 and engine controller 2002 is performed through reader controller 106 when reader controller 106 is provided between printer controller 2103 and engine controller 2002. An operation, in case printer controller 2103 generates commands while reader controller controls the copy mode, will be described hereinafter.

Figure 17B:
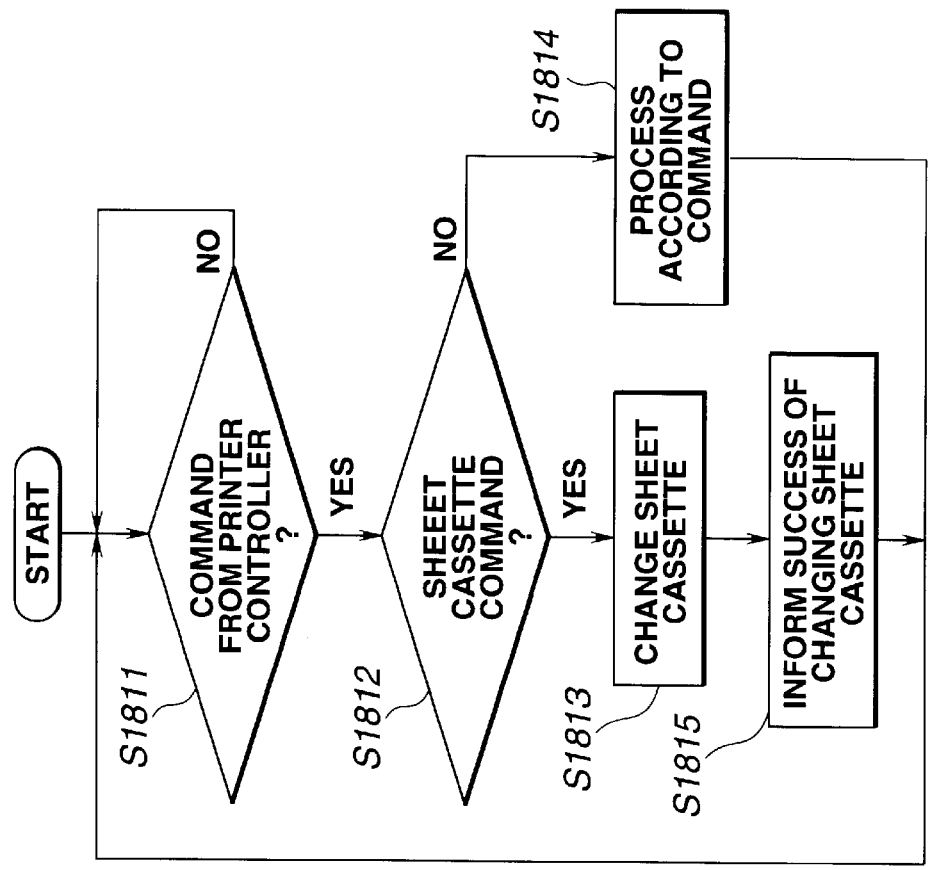
FIG. 17 shows a flowchart when the printer controller simply commands the engine controller.
Figure 17A:
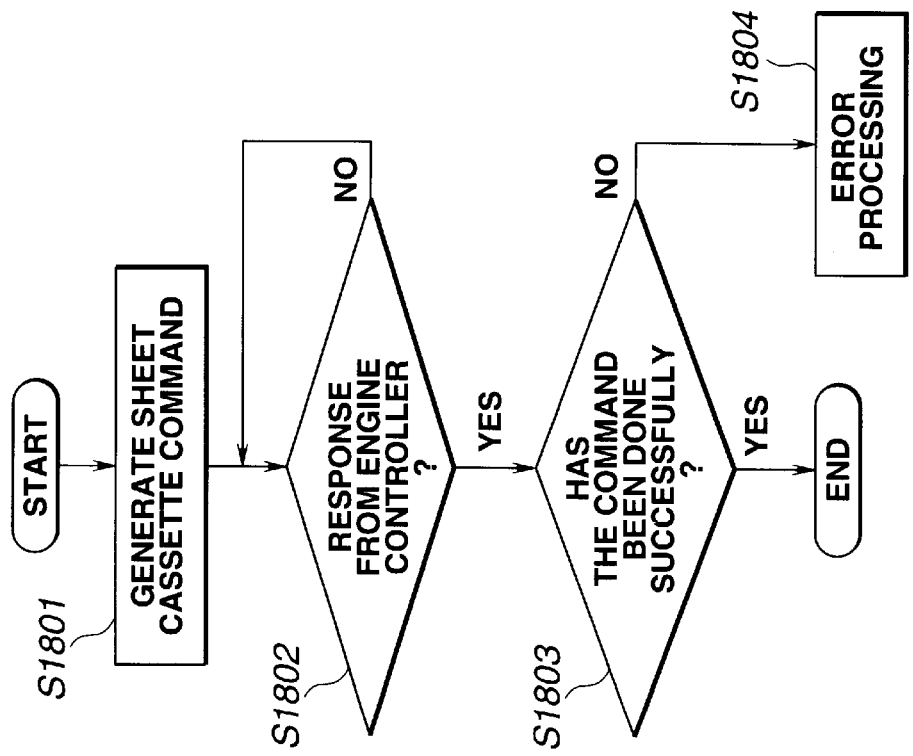

First of all, in order to help your understanding, a command generation sequence in the system without reader controller 106, that is the system shown in FIG. 3, will be described hereinafter. FIG. 17(A) shows a sequence in printer controller 2103, and FIG. 17(B) shows a sequence in engine controller 2002.

Printer controller 2103 generates a sheet cassette change command (S1801) and waits for a response from engine controller 2002 (S1802). Printer controller 2103 determines whether the command has been done successfully when printer controller 2103 receives the response from engine controller 2002 (S1803). If the command has not been done successfully, printer controller 2103 does an error processing (S1804). Meanwhile, engine controller 2002 waits for the command from printer controller 2103 (S1811), determining the contents of the command when the command is generated (S1812). Engine controller 2002 changes to another sheet cassette (S1813) if the command is a sheet cassette change command. If the cassette has been successfully changed, engine controller 2002 informs printer controller 2103 of the success (S1815) and returns to step S1811. If the command is not the sheet cassette change command at step S1812, engine controller 2002 does a process according to the command (S1814) and returns to step S1811.

A process sequence with reader controller 106 will be described hereinafter with reference to FIGS. 18 and 19. Even if reader controller 106 is provided between printer controller 2103 and engine controller 2002, printer controller 2103 and engine controller 2002 do the process shown in FIG. 17.

Figure 18:
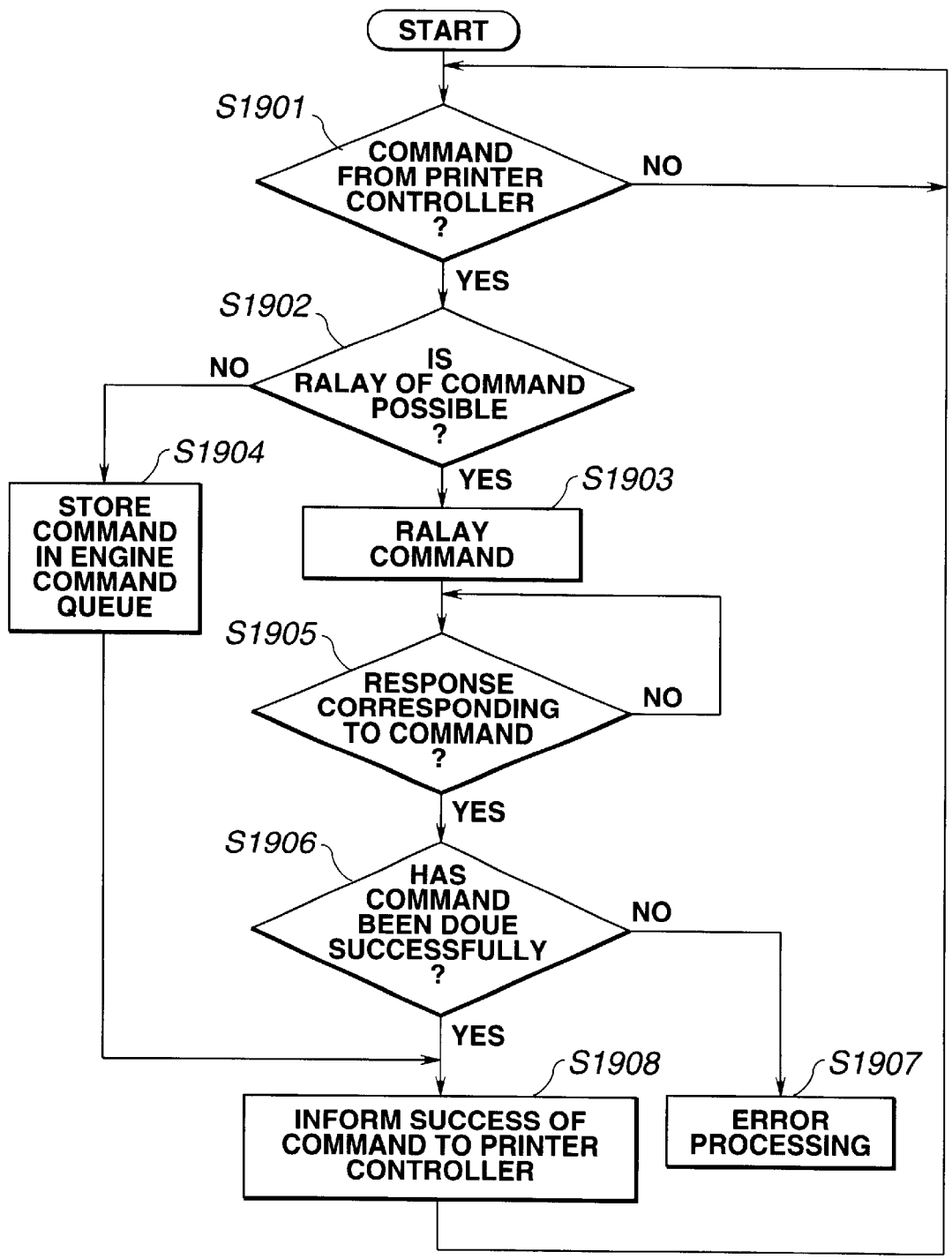
FIG. 18 shows a flowchart when the reader controller relays commands received from the printer controller to the engine controller.
Figure 19:
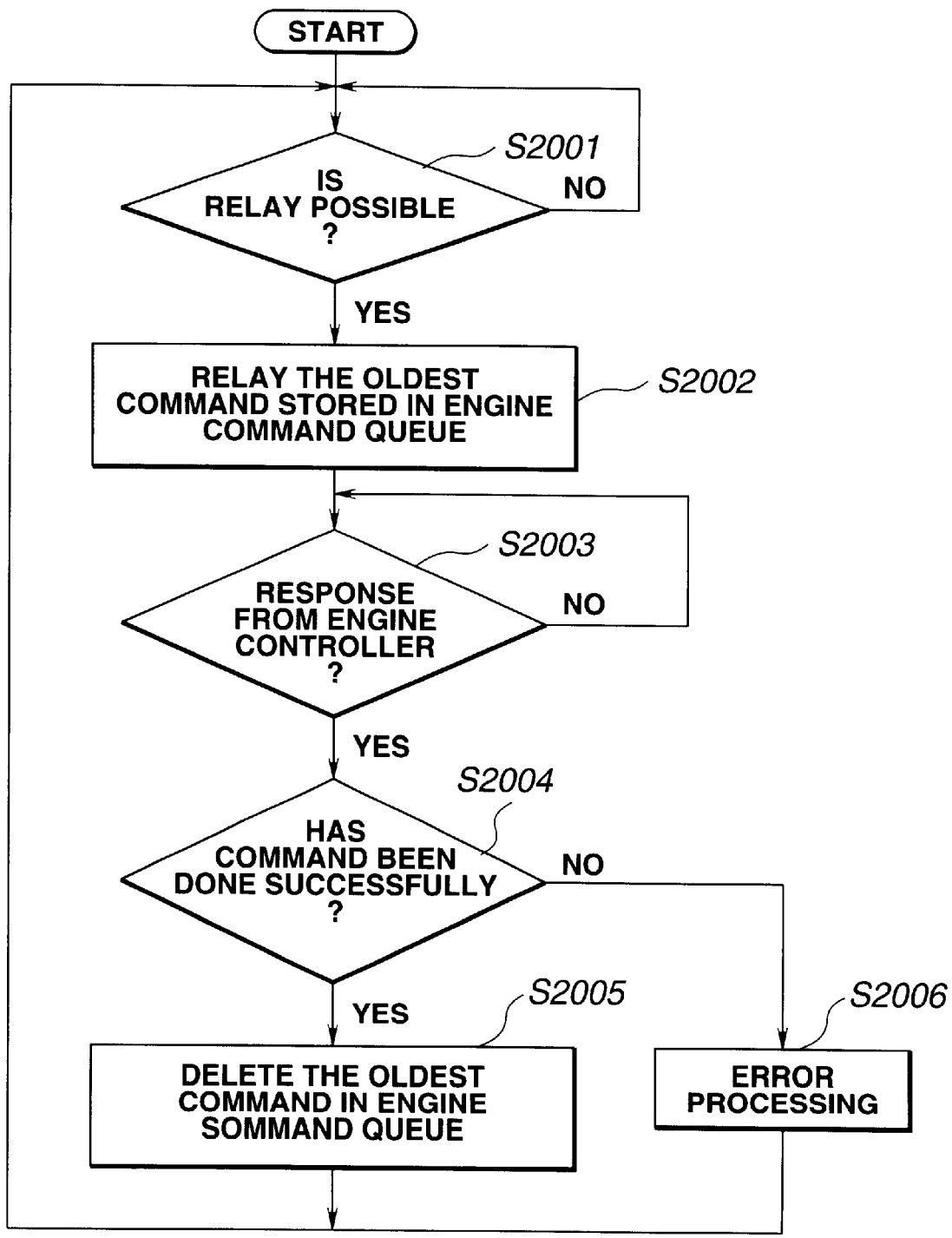
FIG. 19 shows a flowchart when the reader controller relays commands received from the printer controller to the engine controller.

FIG. 18 shows a flowchart showing reader controller 106 receiving commands from printer controller 2103 and sending statuses to printer controller 2103. Reader controller 106 receives a command from printer controller through /CCMD signal line by serial communication controller 2205 (S1901). Reader controller 106 determines whether it is possible to relay the command to engine controller 2002 (S1902).

If the relay is possible, reader controller 106 relays the command to engine controller 2002 through signal line /PCMD (S1903) and waits for a response corresponding to the command (S1905). For example, it is possible to relay the command when reader controller 106 does not send any command to engine controller 2002 in order to perform the copy mode. If the response indicates the command has been done successfully, reader controller 106 informs printer controller 2103 of the success (S1908). If the response indicates the command has not been done successfully, reader controller 106 does an error processing step, such as resending the command (S1907).

If the relay is not possible at step S1902, reader controller 106 stores the command received from printer controller 2103 in engine command queue (S1904). For example, the relay is not possible when the command of the print mode interferes with the performance of the copy mode.

Then, reader controller 106 relays the success of command to printer controller 2103 through /CSTS signal line by using serial communication controller 2205 (S1908). The information after step S1904 would be pseudo-information.

Processing the commands stored in the engine command queue will be described hereinafter with reference to FIG. 19. If it becomes possible to relay the command received from printer controller 2103 (S2001), reader controller 106 relays the oldest command stored in the engine command queue to engine controller 2002 through signal line /PCMD (S2002) and waits for a response from engine controller 2002 (S2003).

Then, if the command has been done successfully (S2004), reader controller 106 deletes the oldest command in the engine command queue (S2005). If the command has not been done successfully, reader controller 106 does an error processing (S2006).

As mentioned above, even if reader controller 106 is provided between printer controller 2103 and engine controller 2002, printer controller 2103 and engine controller 2002 need not be adapted or modified to accommodate reader controller 106.

Figure 20:
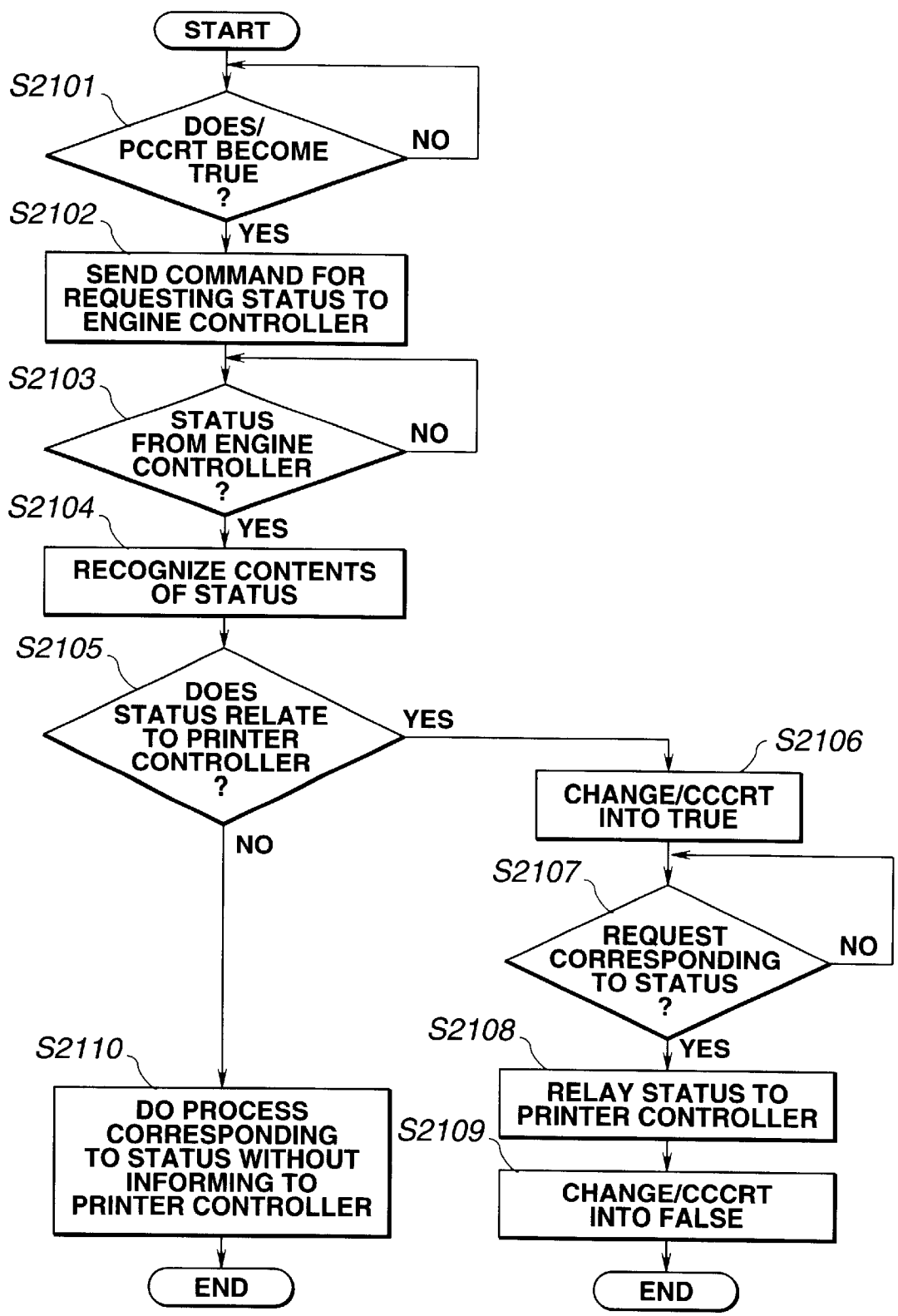
FIG. 20 shows a flowchart when the reader controller receives a state change signal from the engine controller.

FIG. 20 shows a flowchart of reader controller 106 when a state change signal should be sent to both reader controller 106 and printer controller 2103. If /PCCRT becomes TRUE (S2101), reader controller 106 sends a command for requesting the status to engine controller 2002 (S2102). If the status is sent from engine controller 2002 (S2103), reader controller 106 recognizes the contents of the received status (S2104).

If the status relates to printer controller 2103 (S2105), reader controller 106 generates state change signal /CCCRT by having control circuit 2208 set a flag in order to relay the status to printer controller 2103 (S2106). For example, the status relates to printer controller 2103 when the status indicates that the size of the sheet cassette is changed. Then, if reader controller 106 receives a request corresponding to the status change signal (S2107), reader controller 106 relays the status to printer controller 2103 (S2108) and then changes /CCCRT to FALSE (S2109).

On the other hand, if the status does not relate to printer controller 2103, reader controller 106 does a process corresponding to the status without informing to printer controller 2103 (S2110).

Since the gate function of control circuit 2208 is opened in the print mode, state change signal /PCCRT is directly relayed to printer controller 2103 as state change signal /CCCRT.

Figure 21:
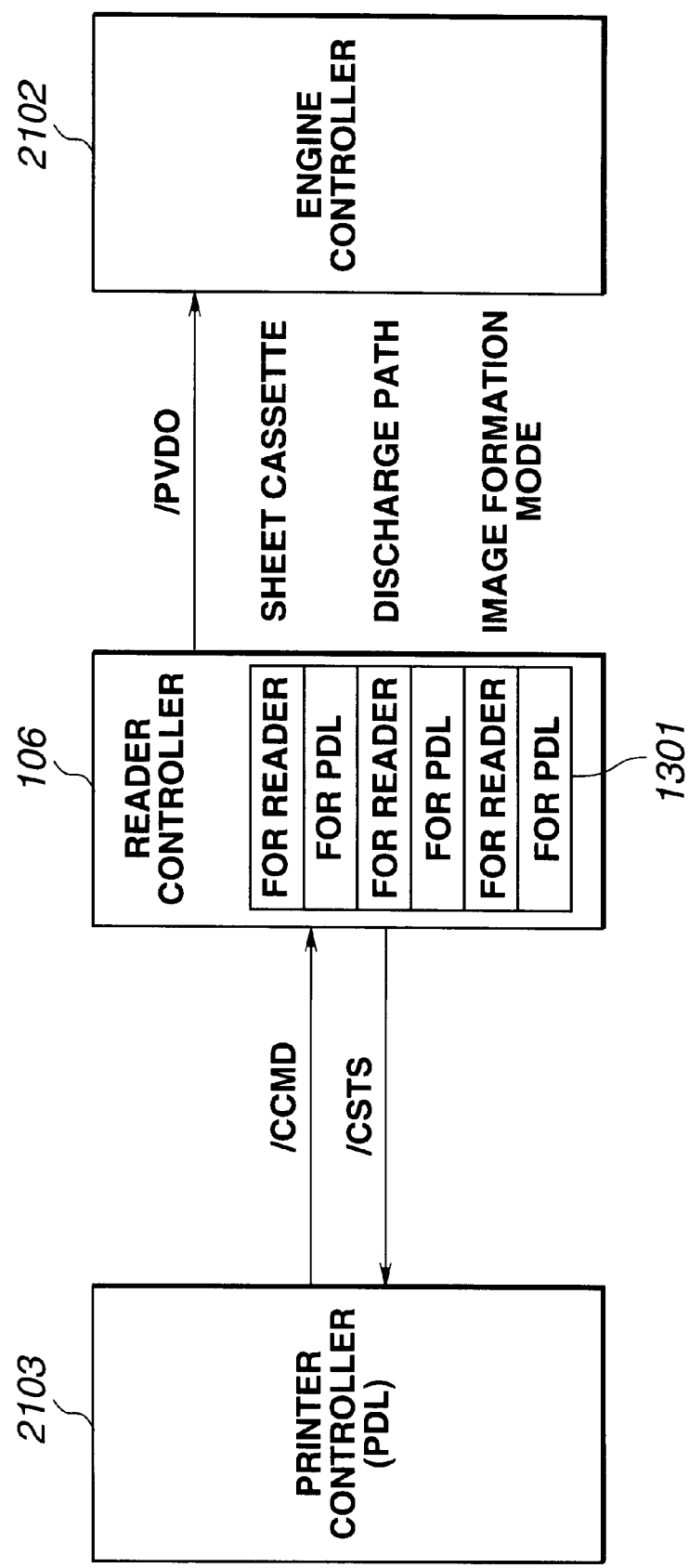
FIG. 21 shows exchanges of data when a print request is generated during a copy operation.

FIG. 21 shows data storage and exchanges of data when a print request is generated during a copy operation. In the mean time, Engine controller 2002 controls the image formation by receiving image signal /PVDO received from reader controller 106. As described in FIG. 8, sheet cassette, discharge path, image formation mode, and so on have been designated by communication between printer controller 2103 and engine controller 2002. Numeral 1301 indicates a buffer for various designation value. Buffer 1301 is provided in reader controller 106, for example in CPU. Values designated by reader controller 106 and values designated by printer controller 2103 are stored in different areas of buffer 1301.

It is not preferable that a print operation interrupt a copy operation, in view of usability. Therefore, the print operation is put off until the copy operation is finished.

Figure 22:
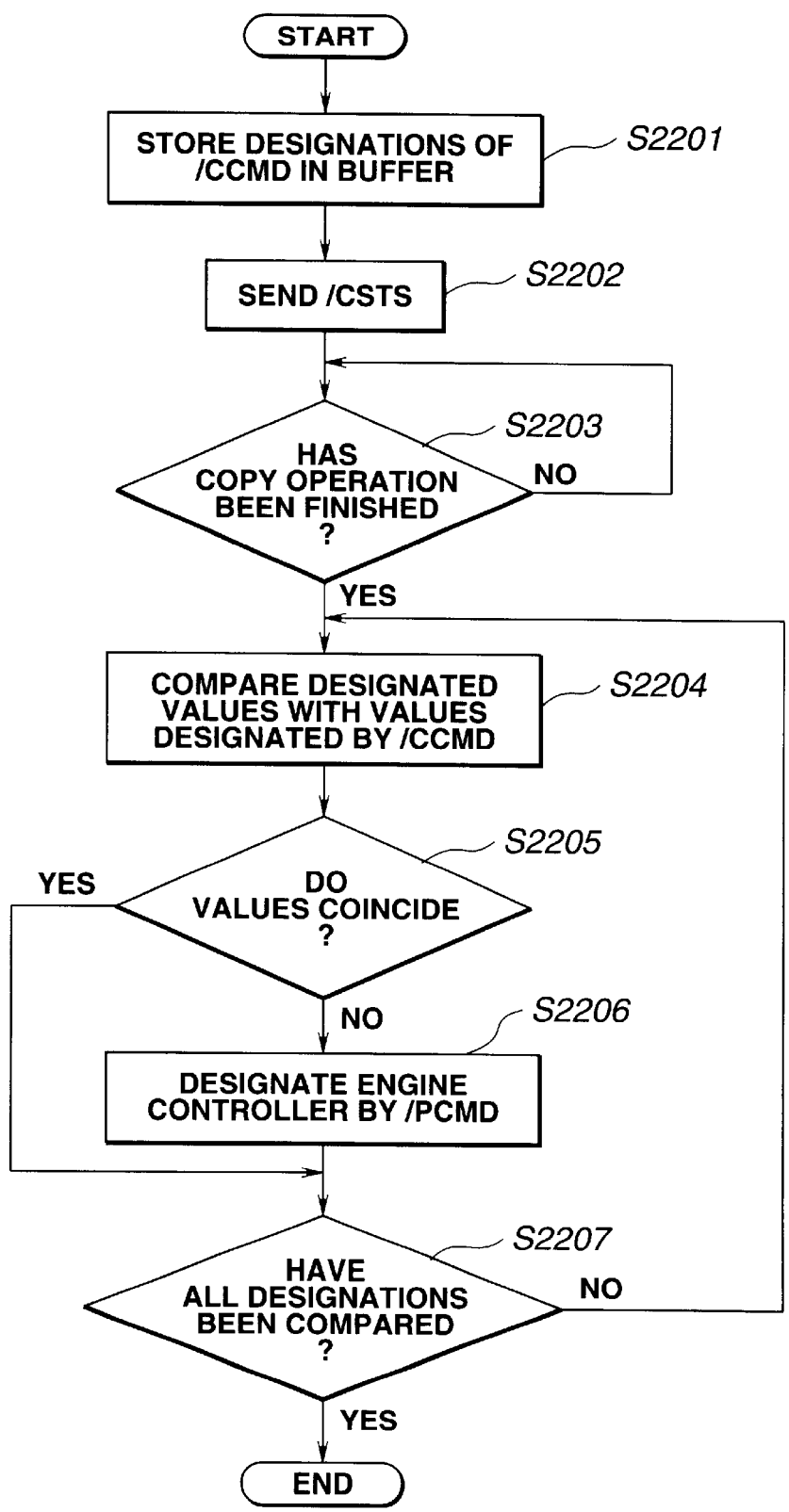
FIG. 22 shows a flowchart when the reader controller designates the engine controller at a boundary of modes.

However, status /CSTS corresponding to command /CCMD must be sent within a predetermined time. Then, a designation value requested by /CCMD is stored in an area for PDL of buffer 1301. When a designation value for reader differs from the designation value for PDL, reader controller 106 should designate to engine controller 2002 before starting the print operation and after the copy operation. FIG. 22 shows this process concretely.

It is assumed that the copy operation is going on, and the designations are an upper cassette, a face-up discharge, and color mode. Meanwhile, if printer controller 2103 requests a print operation, although the execution of the print operation is put off, the various designations can be done. It is assumed that the designations are an upper cassette, a face-down discharge, and black and white. In that case, reader controller 106 stores the designations in a predetermined area of buffer 1301 (S2201), sends status /CSTS to printer controller 2103 (S2202). When the copy operation has been finished (S2203), reader controller 106 compares the values for copy with the values for print (S2204). If the value for copy coincides with the value for print (S2205), reader controller 106 let it be. If not, reader controller 106 updates the value by sending command /PCMD (S2206).

In the above example, both reader controller 106 and printer controller 2103 designate an upper cassette. Therefore, it is unnecessary to send sheet cassette designation command to engine controller 2002 when changing to the print operation. On the other hand, regarding a discharge path and an image formation mode, the designations differ for the copy operation and the print operation. Therefore, reader controller 106 sends commands for designating a discharge path and an image formation mode to engine controller 2002 upon finishing the copy operation. Reader controller 106 repeats this process (S2204~S2207).

The process of requesting a copy operation during a print operation will be described by using FIG. 23. In this case, it is preferable to interrupt the print operation, in view of usability.

Figure 23:
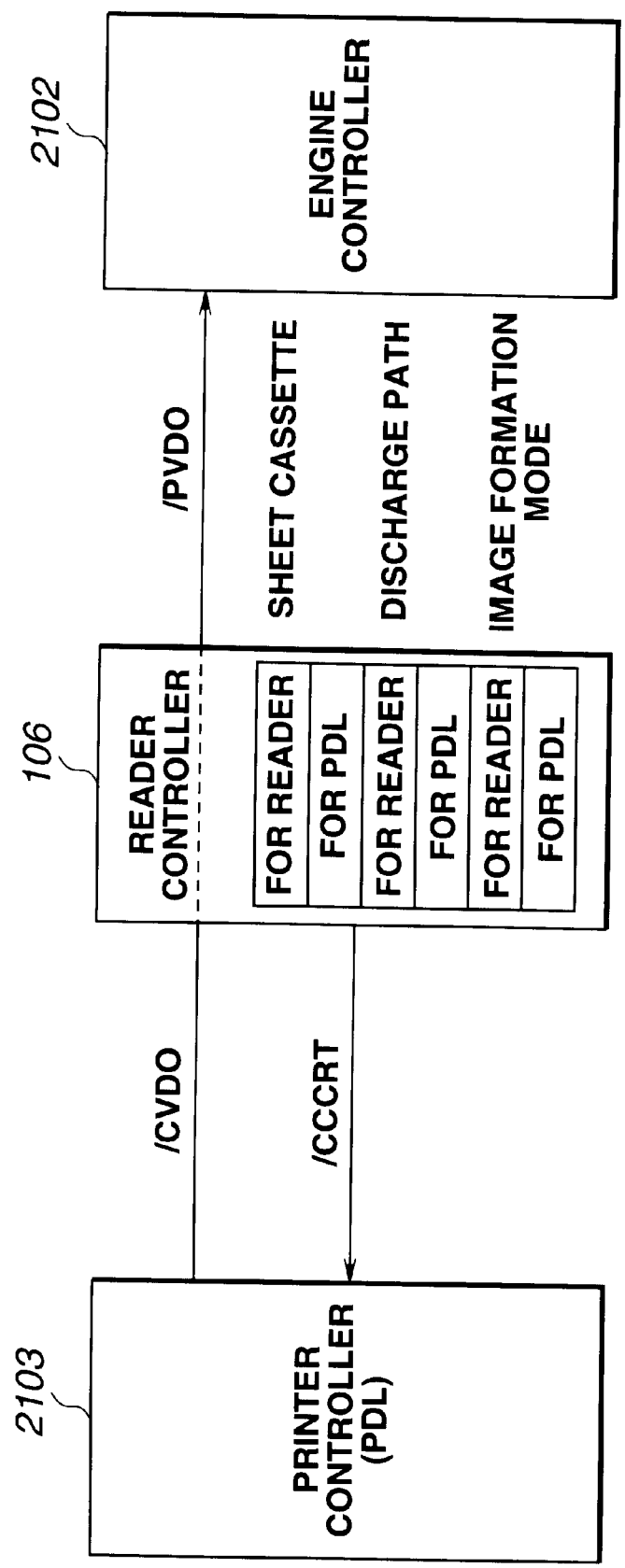
FIG. 23 shows exchanges of data when a copy request is generated during a print operation.

In the printer mode, as shown in FIG. 23, selector 2201 selects image data /CVDO received from printer controller 2103 and sends image data /CVDO as /PVDO to engine controller 2002. It is assumed that the designations are an upper cassette, face-down discharge, and black and white. Engine controller 2002 can not determine how many pages will be printed until /PPRNT becomes a high level (FALSE). It is assumed that four pages of image will be printed. Unless reader controller 106 interrupts during the print operation, four /PTOP signals are generated as shown in FIG. 6 from engine controller 2002.

Figure 24:
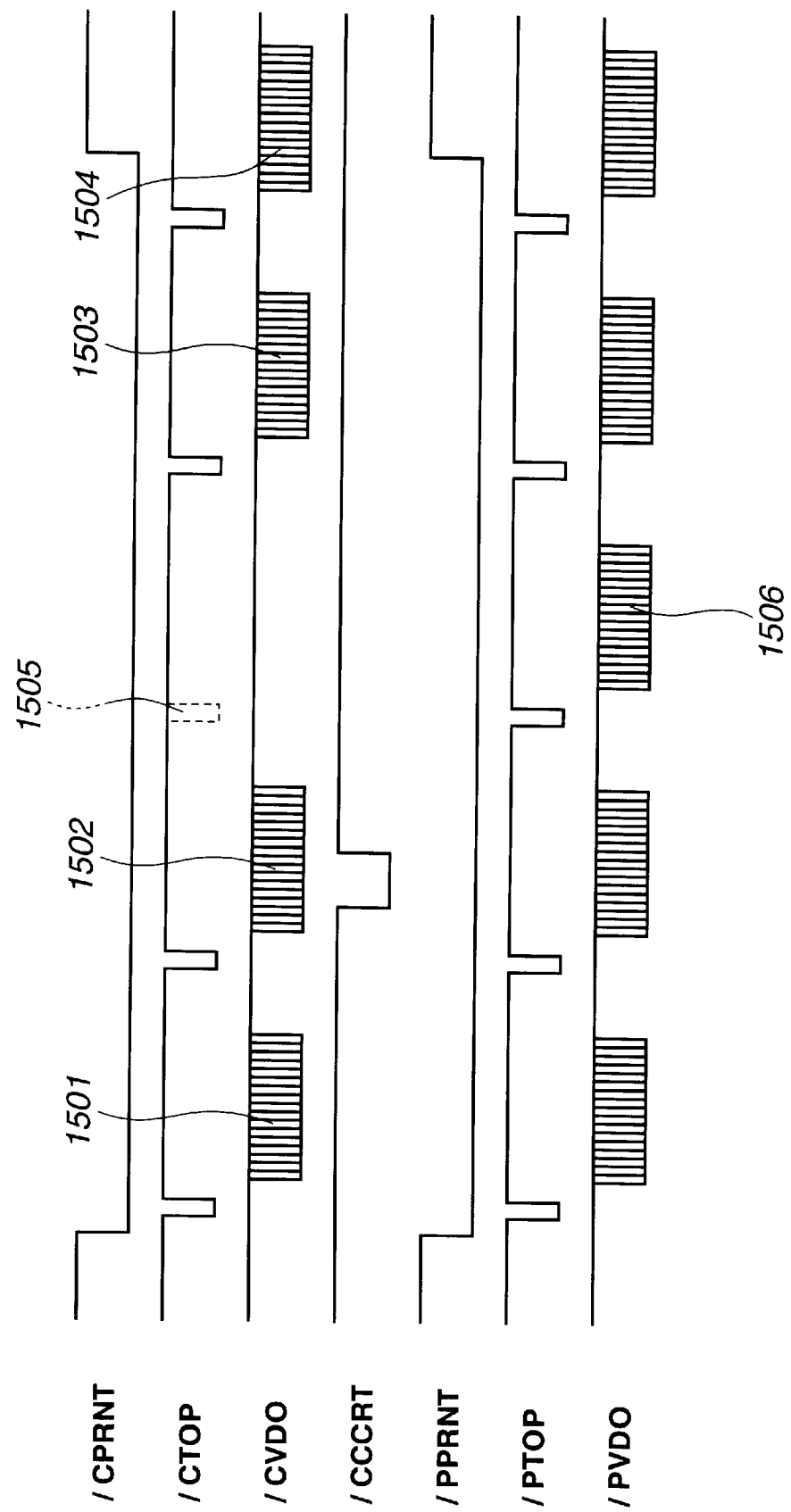
FIG. 24 shows a timing chart when a copy request is generated during a print operation.

It will be described with reference to FIG. 24 that one page of a color copy interrupts on the second page of a print. Reader controller 106 sends /PPRNT to engine controller 2002 in accordance with /CPRNT received from printer controller 2103. Reader controller 106 receives /PTOP signal from engine controller 2002 and sends the signal as /CTOP signal to printer controller 2103. In this manner, image data 1501 of the first page and image data 1502 of the second page are printed.

It is assumed that a copy request interrupts during the second page printing. Reader controller 106 sends /CCCRT to printer controller 2002. /CCCRT means that reader controller 106 wants to use printer controller 2002 for the copy operation. /CCCRT is generated by control circuit 2208. After printer controller 2103 receives /CCCRT, it waits for a next /CTOP. Unless printer controller 2103 receives the next /CTOP, printer controller 2103 waits to send the third page image data 1503.

When reader controller 106 receives the third /PTOP, reader controller 106 does not send the third /CTOP 1505, in other words, does not relay the third /PTOP to printer controller 2103. That is, reader controller 106 masks the third /PTOP. Reader controller 106 uses the third /PTOP for sending the original image data 1506 from reader 101. When image data 1506 has been sent, reader controller 106 cancels the mask of /PTOP. Then, the fourth /PTOP is relayed as the third /CTOP to printer controller 2103. Printer controller 2103 sends image data 1503 of the third page and image data 1504 of the fourth page in response to the third and fourth /CTOP. In this manner, one page copy can interrupt a four page print.

Although a constitution of software counter in reader controller 106 will be described hereinafter, printer controller 203 also has same constitution of software counter.

Figure 25:
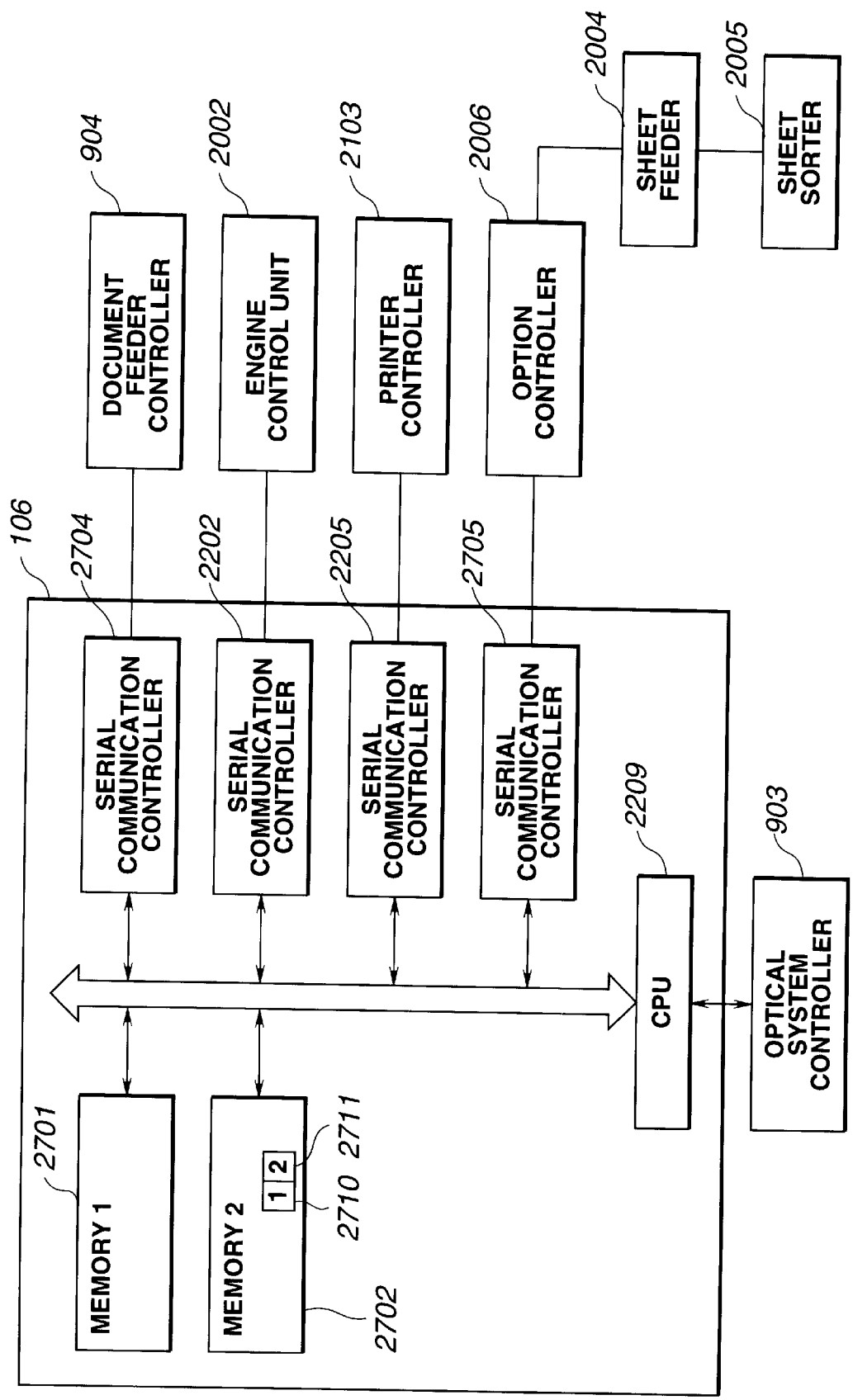
FIG. 25 shows a block diagram regarding a software counter in the reader controller.

FIG. 25 shows a block diagram regarding a software counter in reader controller 106. Serial communication controllers 2202, 2205, 2704, and 2705 communicate with engine controller 2002, printer controller 2103, document feeder controller 904, option controller 2006 respectively, and are connected to CPU 2209.

Detachable memory 2701 and fixed memory 2702 are connected to CPU 2209 which controls reader controller 106. Memory 2702 is fixed to a motherboard of reader controller 106. Memory 2701 and 2702 store a counter value. Memory 2701 and 2702 are nonvolatile memories, which can hold information regardless of the power status of reader 101, such as a SRAM with a battery or a EEPROM.

CPU 2209 monitors and relays commands received from printer controller 2103 to engine controller 2002 and option controller 2006. CPU 2209 counts the number of sheets processed by engine controller 2002 and option controller 2006 in accordance with the commands, and stores the count value in memories 2701 and 2702. CPU 2209 also counts the number of documents processed by reader controller 2103 (CPU 2209) in accordance with the control of reader controller 2103.

Figure 26:
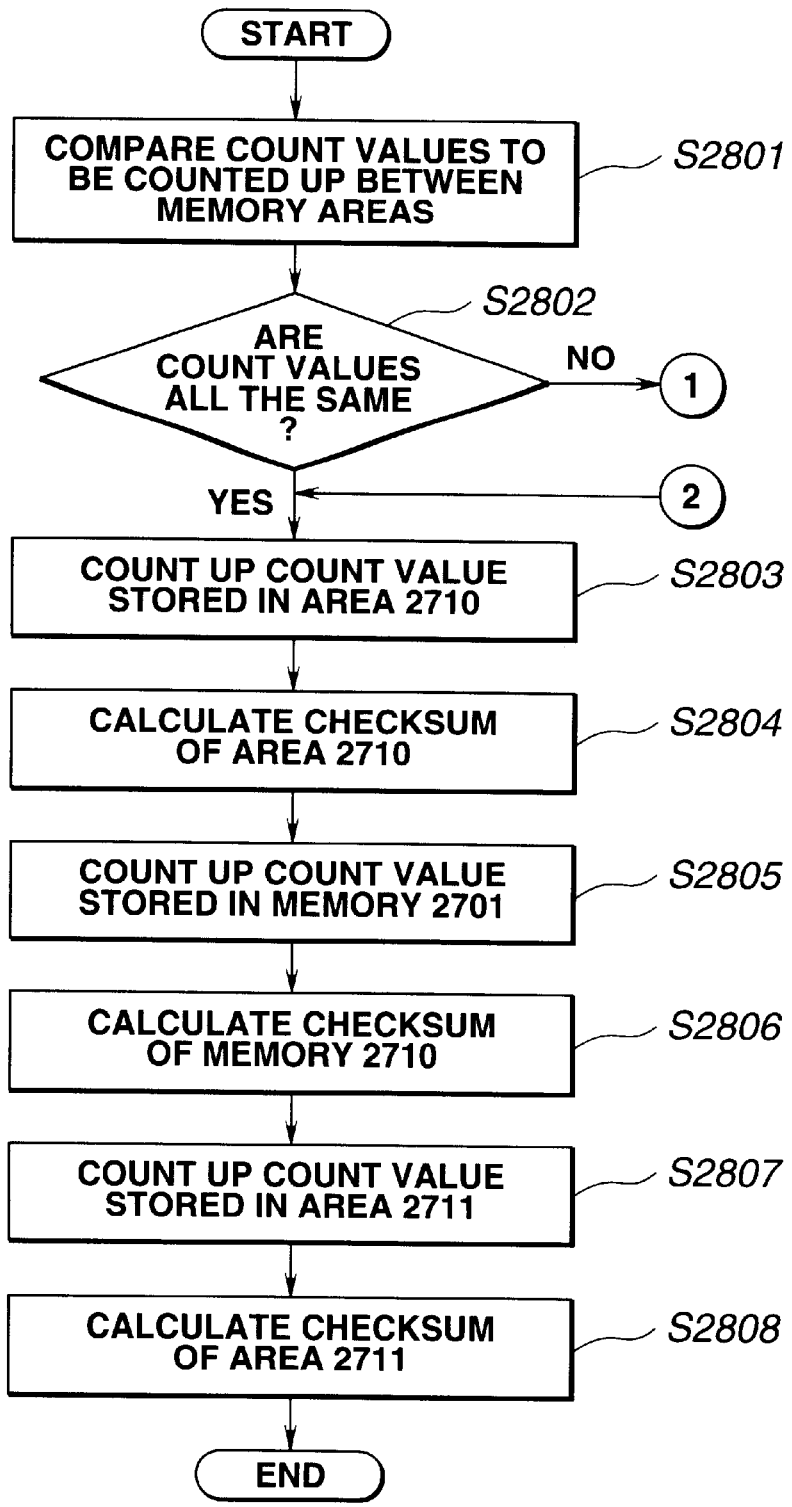
FIG. 26 shows a flowchart when the reader controller counts up.

It is desirable to store the same count value in three or more memories, because the correct value can be determined by finding a common value in a couple of memories if there is any error in a certain memory. But it is not preferable to adopt three or more memories, in view of cost. Therefore, two areas 2710 and 2711 to store a count value are provided in memory 2702 such that they store the same count value at different timing. As a result, reader controller 106 has a third pseudo-memory. It will be described with reference to FIGS. 26 and 27 that reader controller 106 stores a count value when engine controller 2002 controls printing. Reader controller 106 compares count values to be counted between memory 2701 and areas 2710 and 2711 of memory 2702 (S2801).

Reader controller 106 discriminates if the count values are all the same (S2802). If the count values are all the same, reader controller 106 counts the count value stored in area 2710 of memory 2702 (S2803). Then, reader controller 106 calculates a checksum of area 2710 of memory 2702, and stores the checksum result (S2804).

Furthermore reader controller 106 counts the count value stored in memory 2701 (S2805). Then, reader controller 106 calculates a checksum of memory 2701, and stores the checksum result (S2806). Reader controller 106 counts the count value stored in area 2711 of memory 2702 (S2807). Then, reader controller 106 calculates a checksum of area 2711 of memory 2702, and stores the checksum result (S2808).

A power off during the operation or a noise around printer 2001 could change the count value stored in memory 2701 or 2702. In this case, reader controller 106 recognizes it at step S2802 and corrects it.

Figure 27:
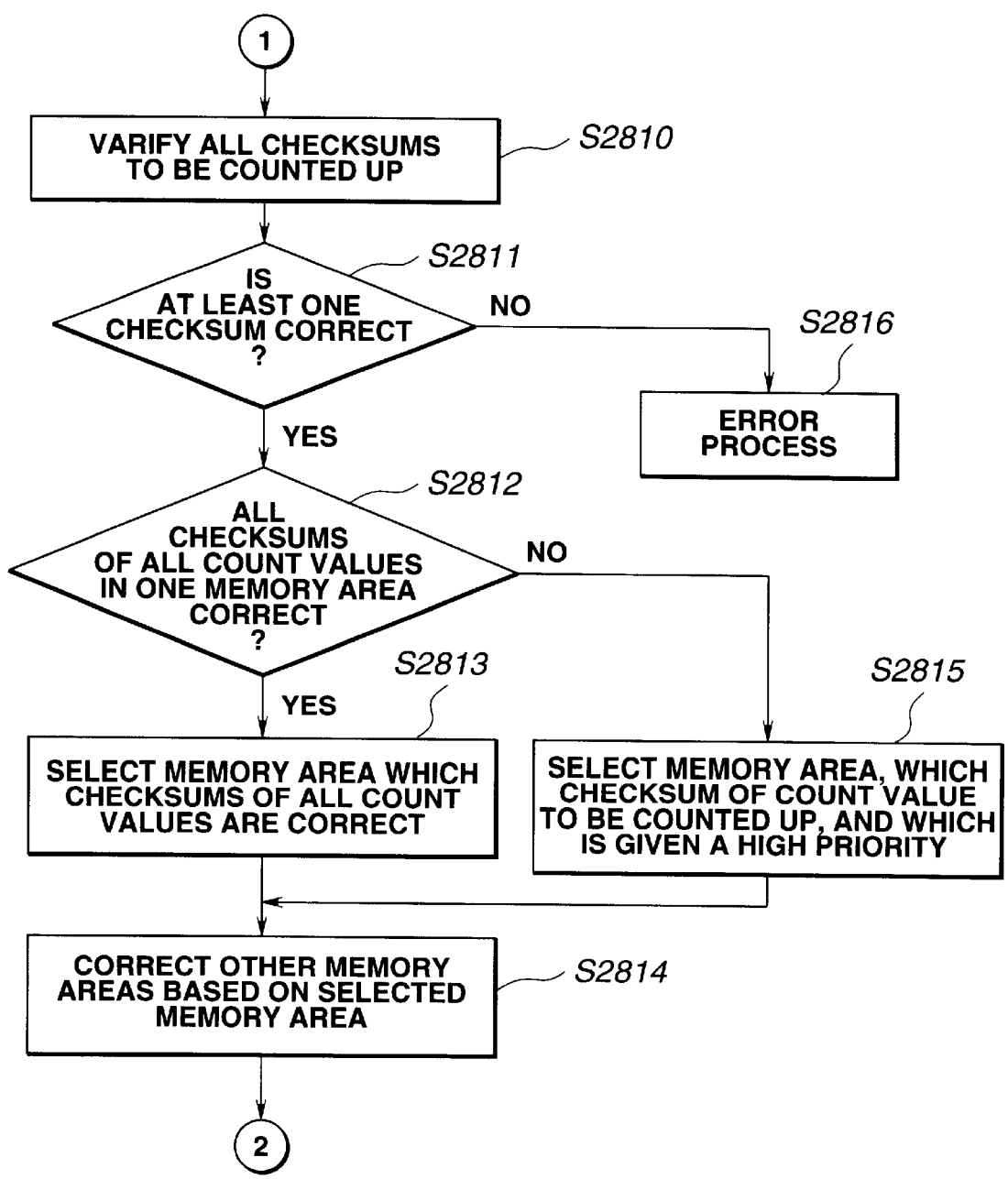
FIG. 27 shows a flowchart when the reader controller corrects a count value.

FIG. 27 shows a flowchart for correcting the count value. Reader controller 106 verifies all checksum values of count values to be counted up in all memory areas in order to find an incorrect value (S2810). If all checksums are incorrect (S2811), reader controller 106 performs an error process (S2816). If at least one checksum is correct, reader controller 106 discriminates if checksums of all count values, which includes the count value to be counted and other count values, in one memory area are correct (S2812). If yes at step S2812, reader controller 106 determines to correct other memory areas based on the memory area which checksums of all count values are correct (S2813), and correct other memory (S2814). If no at step S2812, reader controller 106 determines to correct other memory areas based on the memory area, which the checksum of the count value to be counted up is correct, and which is given a high priority (S2815), and corrects other memory (S2814).

Figure 28:
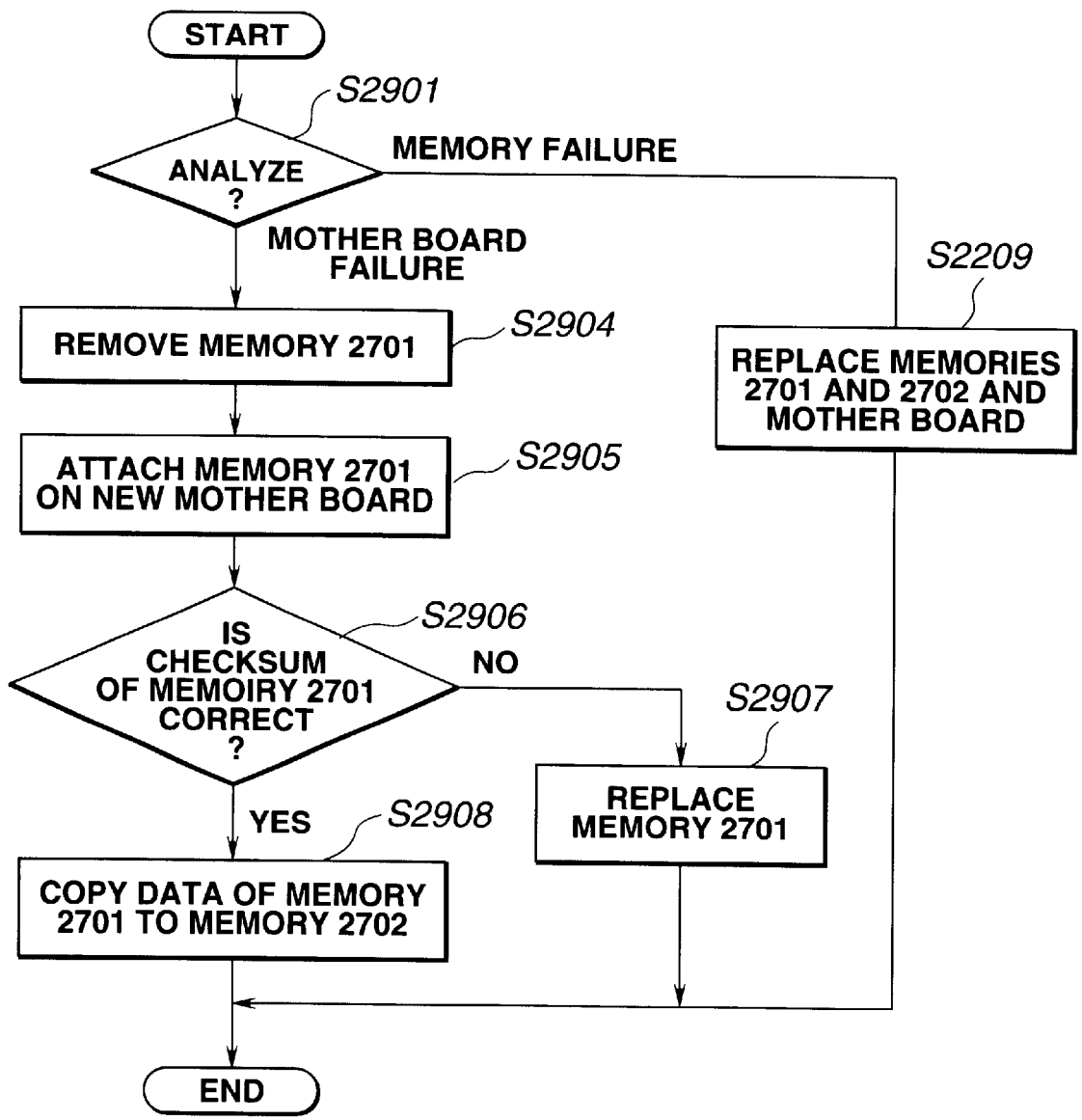
FIG. 28 shows a manner of repairing the memory error.

FIG. 28 shows a manner of repairing the memory error. The service person analyzes the cause of the memory error (S2901). If the checksums of all memory areas are incorrect, the service person replaces memories 2701 and 2702 and the mother board with new ones, because both memories 2701 and 2702 might have a failure (S2909). In this case, the count values are lost.

If it is found that the mother board has a failure and memories 2701 and 2702 do not have a failure, the service person removes memory 2701 from the mother board (S2904). Then, the service person attaches memory 2701 on a new mother board (S2905). The service person checks if a checksum of memory 2701 is correct (S2906). If the checksum of memory 2701 is incorrect, the service person replaces memory 2701 with new one (S2907). In this case, the count values are lost.

If the checksum of memory 2701 is correct at step S2906, the service person copies data of memory 2701 to areas 2710 and 2711 of memory 2702 (S2908).

Figure 29:
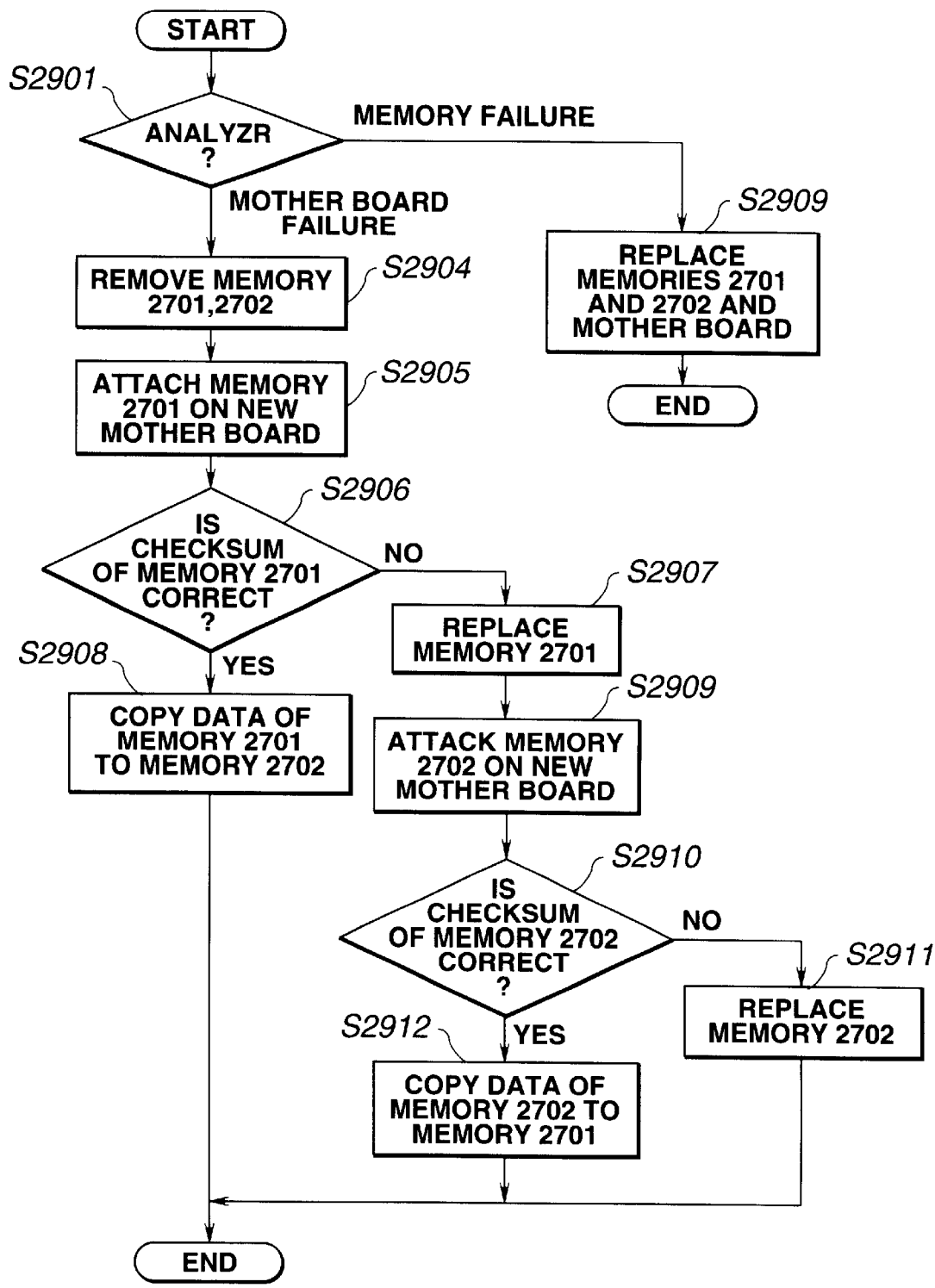
FIG. 29 shows a manner of repairing the memory error.

The above manner is for the case that memory 2701 is only a detachable memory. FIG. 29 shows a manner of repairing the memory error in case of that memory 2702 is a detachable memory too. The explanation of the steps same as FIG. 28 will be omitted. The service person removes memories 2701 and 2702 at step S2704. If the checksum of memory 2701 is incorrect at step S2906, the service person replaces memory 2701 with new one at step S2907, and attaches memory 2702 on a new mother board (S2909). Then, the service person checks if a checksum of memory 2702 is correct (S2910). If the checksum of Memory 2702 is incorrect, the service person replaces memory 2702 with new one (S2911). If the checksum of memory 2702 is correct, the service person copies data of memory 2702 to memory 2701 (S2912).

Reader controller 106 controls operation panel 905 (FIG. 13) to display the count value stored in memories 2701 and 2702. Printer controller 2103 controls operation panel 907 to display a count value stored in memories in printer controller 2103.

Figure 30:
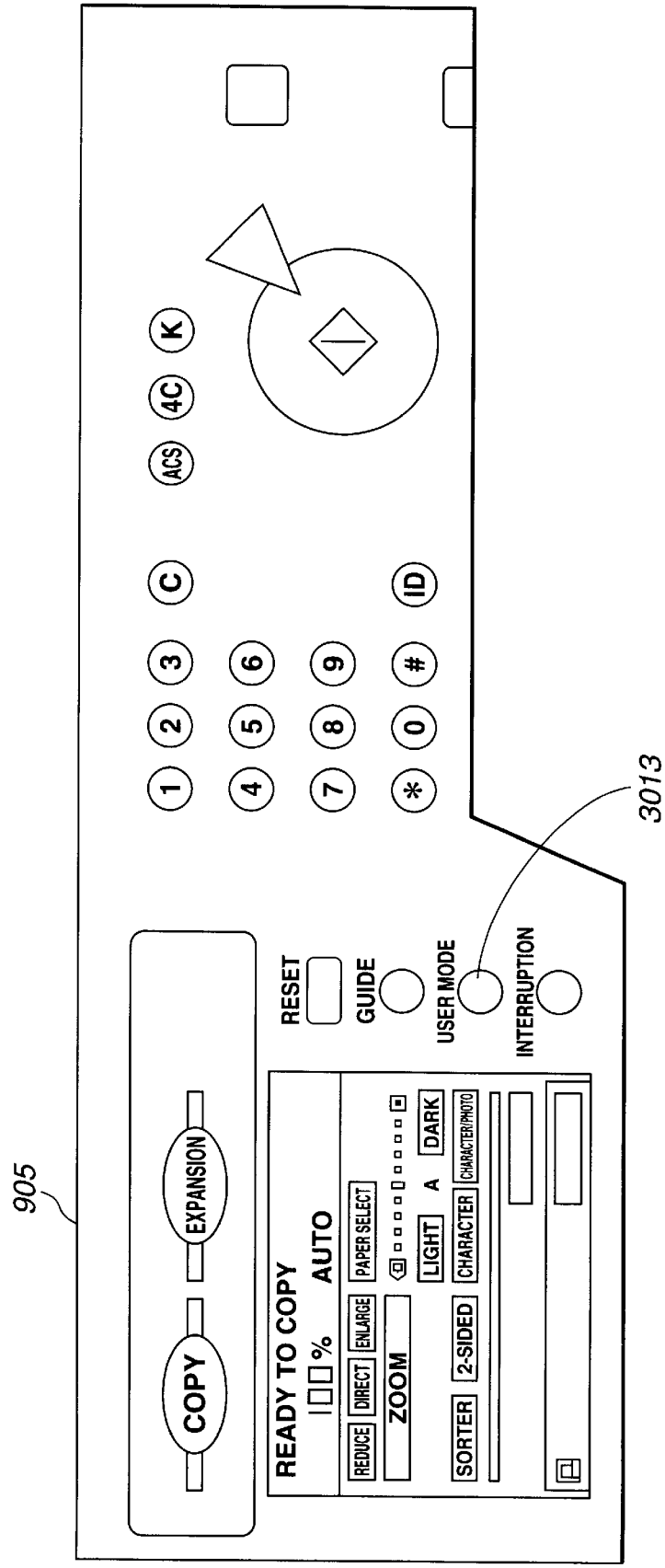
FIG. 30 shows the operation panel of the reader.
Figure 31:
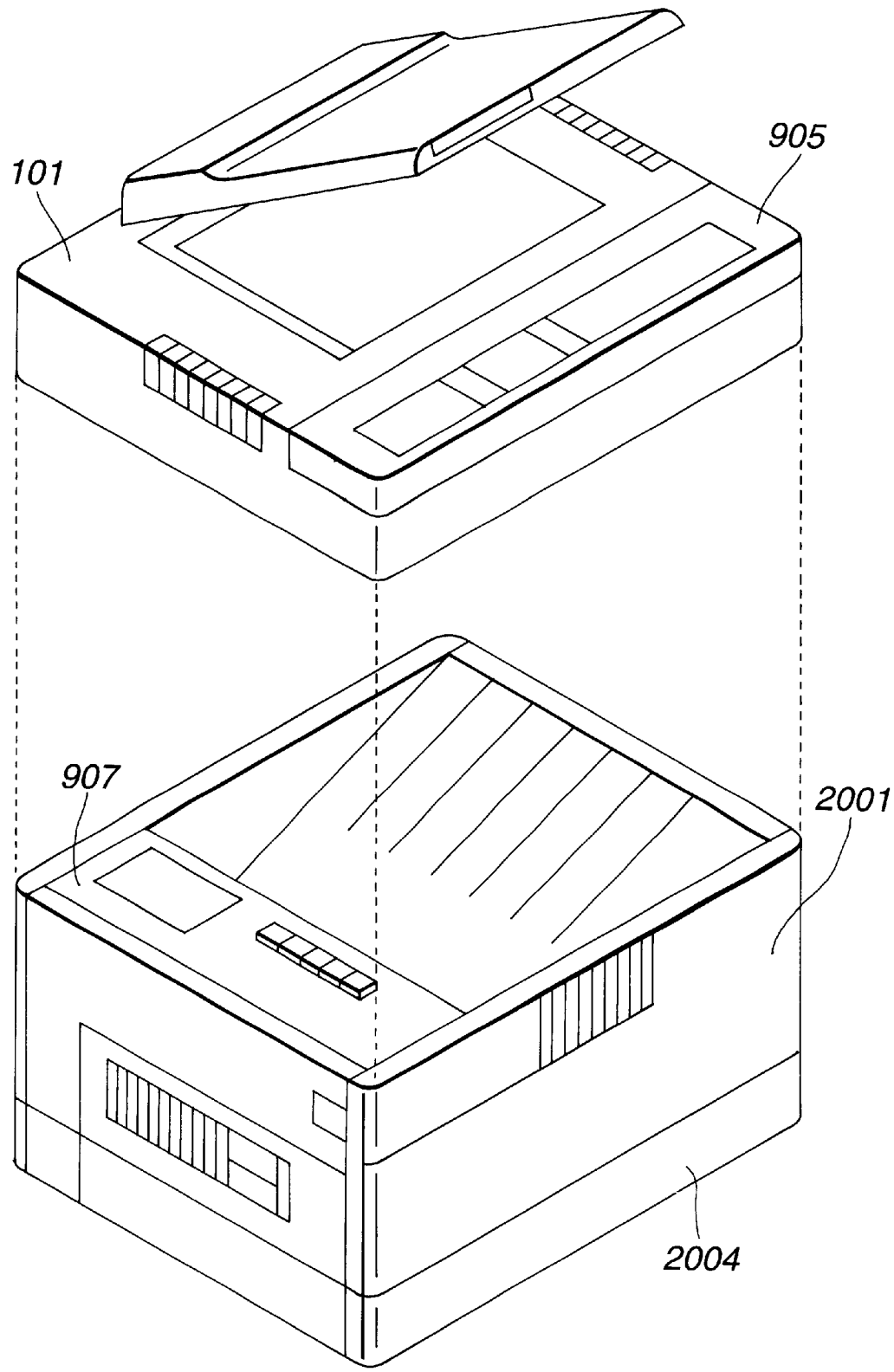
FIG. 31 shows a relative position of the reader, the printer, and the operation panels.

FIG. 30 shows operation panel 905. Reader controller 106 causes display 3001 of reader 101 to display the count value in response to user mode key 3013 of operation panel 905 being pushed. As shown in FIG. 31, operation panel 905 is provided on top of reader 101, while operation panel 907 is provided on top of printer 2001. Seeing operation panel 907 is easy without reader 101, but is difficult when reader 101 is placed above printer 2001. Therefore, reader controller 106 controls operation panel 905 to display count values of printer 2001 instead of displaying them on operation panel 907.

Reader controller 106 is provided between printer controller 2103 and engine controller 2002, and relays all command and status signals between them. Therefore, when printer controller 2103 commands engine controller 2002 to print an image, reader controller 106 can grasp a print mode, a print timing, and so on. Reader controller 106 counts the number of sheets processed by printer controller 2103 in each mode instead of printer controller 2103 counting.

FIG. 32 shows that a count value, which has been counted by printer controller 2103 before reader controller 106 is connected to printer controller 2103, is transferred to reader controller 106 when reader controller 106 is provided between printer controller 2103 and engine controller 2002. FIG. 32(A) shows a flowchart executed by reader controller 106, and FIG. 32(B) shows a flowchart executed by printer controller 2103. Reader controller 106 waits to receive a counter value from printer controller 2103 when reader controller 106 is provided between printer controller 106 and engine controller 2002 (S3001). On the other hand, printer controller 2103 checks whether reader controller 106 has been provided between printer controller 2103 and engine controller 2002 (S3004). Printer controller 2103 sends the count value held in itself to reader controller 106 when printer controller 2103 detects that reader controller 106 is provided between them (S3005). Then, printer controller 2103 prohibits all counting in printer controller 2103 (S3006).

Reader controller 106 stores the count value received from printer controller 2103 in memory 2701 and areas 2710 and 2711 of memory 2702 if reader controller 106 detects receiving the count value (S3002). Then, reader controller 106 sets itself to count not only the number of documents processed by reader controller but also the number of sheets processed by printer controller 2103 (S3003).

The count value of printer controller 2103 is transferred to reader controller 106. Then, all kinds of count values at reader controller 106, printer controller 2103, and option controller 2006 are counted by reader controller 106, and are displayed on operation panel 905.

If it is not prohibited that printer controller 2103 counts when reader controller 106 counts for printer controller 2103, a difference of the count values between printer controller 2103 and reader controller 106 may happen because of a power down during the count processing. That is why the processing shown in FIG. 32 is executed. If printer controller 2103 sends the count values to reader controller 106 each time printer controller 2103 counts, it increases the traffic of the communication between printer controller 2103 and reader controller 106. The processing shown in FIG. 32 also prevents the traffic from increasing.

Reader controller 106 counts not only the number of documents processed by reader controller 106 but also the number of sheets processed by printer controller 2103. Reader controller 106 can determine the mode designated by printer controller 2103 and count the number of sheets processed by printer controller 2103 because reader controller 106 relays commands from printer controller 2103 to engine controller 2002. Reader controller 106 counts the count value corresponding to the print mode in accordance with the relayed command. Counting has been described with reference to FIG. 27.

FIG. 33 shows an example of the count values related with printer controller 2103. The modes comprise a print processing type, a sheet size, and a sheet material type (general sheet, special sheet). 1 to 1 is a mode which one original page is printed onto one face of a sheet. 2 in 1 is a mode in which two original page are printed onto one face of a sheet. According to FIG. 33, 527 sheets have been printed in a mode which is comprised by 1 to 1, a two sided print, an A4 size, and a general sheet. The count values shown in FIG. 33 are stored in memory 2701 and two areas in memory 2702.

CPU 2209 in reader controller 106 controls original scanning controller 903 as shown in FIG. 25. Therefore reader controller 106 can grasp all scanning operations in reader 101.

FIG. 34 shows an example of the count values related with reader controller 106. The modes comprise a document color type (black and white, color), a document size, and a reader processing type (magnification). According to FIG. 34, 84 documents have been scanned in a mode which is comprised by a color document, an A4 size, and no magnification. The count values shown in FIG. 34 are stored in memory 2701 and two areas in memory 2702.

Reader controller 106 controls document feeder 801 by controlling document feeder controller 904 as shown in FIG. 25. CPU 2209 of reader controller 106 communicates count information with document feeder controller 904 through serial communication controller 2704. Therefore reader controller 106 can grasp all document feeding operations in document feeder 801.

FIG. 35 shows an example of the count values related with document feeder controller 904. According to FIG. 35, 443 of A4 two sided documents have been fed. The count values shown in FIG. 35 are stored in memory 2701 and two areas in memory 2702.

Reader controller 106 controls sheet feeder 2004 and sheet sorter 2005 by controlling option controller 2006 as shown in FIG. 25. CPU 2209 of reader controller 106 communicates count information with option controller 2006 through serial communication controller 2705. Therefore reader controller 106 can grasp all sheet feeding operations in sheet feeder 2004 and all sheet sorting operations in sheet sorter 2005.

FIGS. 36 and 37 shows examples of the count values related with option controller 904. According to FIG. 36, 998 of A4 general sheets have been fed. According to FIG. 37, 494 of A4 sheets have been processed in the mode which is comprised a non-sort and a staple. The count values shown in FIGS. 36 and 37 are stored in memory 2701 and two areas in memory 2702.

It is to be understood that the invention is not limited in its application to the details of the description and drawings. Also it is to be understood that the phraseology or terminology employed herein is for the purpose of description and not of limitation.

What is claimed is:

1. A reader controller in a reader whose housing provides a display adapted to display a count value processed by a reader function, said reader controller being connected to a printer controller, wherein the printer controller controls an engine controller provided in a printer whose housing provides a display adapted to display a count value processed by a printer function, said reader controller comprising:

controlling means for controlling the reader;

receiving means for receiving a command for the engine controller, from the printer controller, when the reader housing is attached to the printer housing;

counting means for counting a number of documents processed by the reader in accordance with control by said controlling means, and counting, in accordance with the command received by said receiving means, a number of sheets processed by the printer; and causing means for causing the display of the reader to display at least one of the numbers counted by said counting means.

2. A reader controller according to claim 1, wherein said reader controller is provided between the printer controller and the engine controller and further comprises:

sending means for sending the command received by said receiving means to the engine controller.

3. A reader controller according to claim 2, wherein said receiving means receives image data from the printer controller, and said sending means sends the image data received by said receiving means to the engine controller.

4. A reader controller according to claim 3, further comprising:

generating means for generating a command for causing the engine controller to print image data read by the reader, wherein said sending means sends the command generated by said generating means and image data read by the reader to the engine controller.

5. A reader controller according to claim 2, wherein said reader controller and the printer controller are provided in the printer.

6. A reader controller according to claim 1, further comprising:

second receiving means for receiving a number of sheets counted by the printer controller from the printer controller when said reader controller is attached to the printer controller, wherein said counting means counts a number of sheets processed by the printer, in accordance with the number received by said second receiving means and the command received by said receiving means.

7. A reader controller according to claim 1, wherein said receiving means receives a command for an optional apparatus which processes sheets, and said counting means counts a number of sheets processed by the optional apparatus in accordance with the command for the optional apparatus.

8. A reader controller according to claim 7, wherein the optional apparatus comprises a sheet feeder and a sheet sorter.

9. A reader controller connected to a printer controller, said reader controller comprising:

controlling means for controlling a reader;

counting means for counting a number of documents processed by said reader controller, in accordance with control by said controlling means;

first receiving means for receiving a command for an engine controller, from the printer controller;

second receiving means for receiving from the printer controller a count value of sheets processed by the printer controller; and storage means for storing the count value counted by said counting means and the count value received by said second receiving means, wherein said counting means are set to count the number of sheets processed by the printer controller, in accordance with the command received by said first receiving means, when the reader controller is connected to the printer controller.

10. A printing and copying apparatus comprising:

a reader whose housing provides a display adapted to display a count value related to processing by a reader function which reads documents;

a printer whose housing provides a display adapted to display a count value related to processing by a printer function which prints sheets;

an engine controller provided in said printer;

a printer controller connected to said engine controller, said printer controller comprising:

controlling means for controlling said reader, and receiving means for receiving a command for said engine controller from said printer controller when said housing of said reader is attached to said housing of said printer;

counting means for counting a number of documents processed by said controlling means, in accordance with control by said controlling means, and counting a number of sheets processed by said printer controller, in accordance with the command received by said receiving means; and causing means for causing said display of said reader to display the number counted by said counting means.

11. A printing and copying apparatus according to claim 10, wherein said controlling means is provided between said printer controller and said engine controller, said controlling means further comprising:

sending means for sending the command received by said receiving means to said engine controller.

12. A printing and copying apparatus according to claim 11, wherein said receiving means receives image data from said printer controller and said sending means sends the image data received by said receiving means to said engine controller.

13. A printing and copying apparatus according to claim 12, said controlling means further comprising:

generating means for generating a command for causing said engine controller to print image data read by said reader, wherein said sending means sends the command from said printer controller and image data read by said reader to said engine controller.

14. A printing and copying apparatus according to claim 11, wherein said controlling means and said printer controller are provided in said printer.

15. A printing and copying apparatus according to claim 10, wherein said reader is placed above said printer.

16. A printing and copying apparatus according to claim 10, further comprising:

second receiving means for receiving a number of sheets counted by said printer controller from said printer controller when said controlling means is connected to said printer controller, wherein said counting means counts a number of sheets processed by said printer controller in accordance with the number received by said second receiving means and the command received by said receiving means.

17. A printing and copying apparatus according to claim 16, wherein said printer controller sets itself not to count the number of sheets after sending the number of sheets to said controlling means.

18. A printing and copying apparatus according to claim 16, wherein said printer controller detects that said controlling means is connected to said printer controller and responds by sending the number of sheets counted by said printer controller to said controlling means.

19. A printing and copying apparatus according to claim 10, further comprising an optional apparatus which processes sheets, wherein said receiving means receives a command for said optional apparatus and said counting means counts a number of sheets processed by said optional apparatus in accordance with the command for said optional apparatus.

20. A printing and copying apparatus according to claim 19, wherein said optional apparatus comprises a sheet feeder and a sheet sorter.

21. A printing and copying apparatus according to claim 10, wherein said engine controller controls a mechanism of said printer.

22. A printing and copying apparatus according to claim 10, wherein said printer controller is connected to one or more computers and said printer receives code data representing images from said computer and converts the code data into bit map data.

23. A reader controller according to claim 9, further comprising causing means for causing said display of said reader to display the number stored by said storage means.

24. An image processing apparatus comprising:

a first housing which houses a structure for performing a reader function and has a first display to display a first count value, relating to processing by the reader function;

a second housing which houses a structure for performing a printer function and has a second display to display a second count value, relating to processing by the printer function;

a reader controller adapted to control the reader function and to display, on said first display, the first count value;

a printer controller adapted to control the printer function and to display on said second display, the second count value, wherein said reader controller is further adapted to communicate with said printer controller and display on said first display at least one of the count values when said first housing is attached to said second housing.

25. An image processing apparatus according to claim 24, wherein said first housing is attached to said second housing by setting said first housing on said second housing.

26. An image processing apparatus according to claim 24, wherein the reader function further comprises means for copying, means for faxing, and means for scanning, and wherein the printer function further comprises means for printing.

* * * * *

UNITED STATES PATENT AND TRADEMARK OFFICE
CERTIFICATE OF CORRECTION

PATENT NO. : 6,421,515 B1
DATED : July 16, 2002
INVENTOR(S) : Koji Arai et al.

It is certified that error appears in the above-identified patent and that said Letters Patent is hereby corrected as shown below:

Title page,
Item [57], ABSTRACT,
Line 2, "a engine" should read -- an engine --.

Drawings,
Sheet 7, FIG. 7, "RAGARDING" should read -- REGARDING --.
Sheet 8, FIG. 8, "IRQUIRY" should read -- INQUIRY --.
Sheet 17, FIG. 17B, "SHEEET" should read -- SHEET --.
Sheet 18, FIG. 18, "RALAY" (2 occurrences) should read -- RELAY--; and "DOUE" should read -- DONE --.
Sheet 19, FIG. 19, "SOMMAND" should read -- COMMAND --.
Sheet 27, FIG. 27, "VARIFY" should read -- VERIFY --.
Sheet 28, FIG. 28, "MEMOIRY" should read -- MEMORY --.
Sheet 29, FIG. 29, "ANALYZR" should read -- ANALYZER --; and "ATTACK" should read -- ATTACH --.
Sheet 32, FIG. 32B, "COUND" should read -- COUNT --.
Sheet 34, FIG. 36, "FEADER" should read -- FEEDER --.

Column 1,
Line 42, "a engine" should read -- an engine --.

Column 3,
Line 5, "a electrical" should read -- an electrical --; and
Line 45, "here after." should read -- hereinafter. --.

Column 4,
Line 58, "send" should read -- sends --; and
Line 65, "ISTS" should read -- /STS --.

Column 5,
Line 48, "controller" should read -- controller 2103 --; and
Line 55, "a image" should read -- an image --.

UNITED STATES PATENT AND TRADEMARK OFFICE
CERTIFICATE OF CORRECTION

PATENT NO. : 6,421,515 B1
DATED : July 16, 2002
INVENTOR(S) : Koji Arai et al.

It is certified that error appears in the above-identified patent and that said Letters Patent is hereby corrected as shown below:

Column 6,
Line 11, "a operation" should read -- an operation --;
Line 33, "shown" should read -- shown in --; and
Line 50, "a image" should read -- an image --.

Column 8,
Line 24, "controller" should read -- controller 2002 --.

Column 9,
Line 12, "controller" should read -- controller 106 --; and
Line 48, "controller" should read -- controller 2103 --.

Column 10,
Line 51, "mean time," should read -- meantime, --; and "Engine" should read -- engine --.

Column 11,
Line 19, "let" should read -- lets --; and
Line 41, "can not" should read -- cannot --.

Column 13,
Line 22, "mother board" should read -- motherboard --;
Line 25, "mother board" should read -- motherboard --;
Line 27, "mother board" should read -- motherboard --;
Line 29, "mother board" should read -- motherboard --;
Line 39, "case of" should read -- case --;
Line 45, "mother board" should read -- motherboard --; and
Line 47, "Memory" should read -- memory --.

Column 14,
Line 65, "which" should read -- in which --; and
Line 67, "page" should read -- pages --.

UNITED STATES PATENT AND TRADEMARK OFFICE
CERTIFICATE OF CORRECTION

PATENT NO. : 6,421,515 B1
DATED : July 16, 2002
INVENTOR(S) : Koji Arai et al.

It is certified that error appears in the above-identified patent and that said Letters Patent is hereby corrected as shown below:

Column 15,
Line 36, "shows" should read -- show --; and
Line 49, "in a" should read -- of a --.

Signed and Sealed this

Sixth Day of May, 2003

JAMES E. ROGAN
*Director of the United States Patent and Trademark Office*